(12) United States Patent
Kikuchi et al.

(10) Patent No.: US 6,192,756 B1
(45) Date of Patent: Feb. 27, 2001

(54) VIBRATORS VIBRATORY GYROSCOPES A METHOD OF DETECTING A TURNING ANGULAR RATE AND A LINEAR ACCELEROMETER

(75) Inventors: Takayuki Kikuchi, Nagoya; Shosaku Gouji, Ama-Gun; Yukihisa Osugi, Nagoya; Takao Soma, Nishikamo-Gun, all of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/246,835

(22) Filed: Feb. 8, 1999

(30) Foreign Application Priority Data

Feb. 12, 1998 (JP) .................................. 10-029820

(51) Int. Cl.[7] .................................................. G01C 19/00
(52) U.S. Cl. ..................................... 73/504.12; 73/504.04
(58) Field of Search ........................... 73/504.02, 504.03, 73/504.04, 504.12; 310/353, 369; 331/57

(56) References Cited

U.S. PATENT DOCUMENTS

| | | | |
|---|---|---|---|
| 3,583,246 | | 6/1971 | Stahle et al. . |
| 4,127,028 | | 11/1978 | Cox et al. . |
| 4,930,351 | | 6/1990 | Macy et al. . |
| 5,203,208 | * | 4/1993 | Bernstein .......................... 73/504.12 |
| 5,226,321 | * | 7/1993 | Varnham et al. ................. 73/514.02 |
| 5,329,815 | * | 7/1994 | Dunn et al. ....................... 73/504.12 |
| 5,476,007 | * | 12/1995 | Nakamura ......................... 73/504.12 |
| 5,488,862 | * | 2/1996 | Neukermans et al. ........... 73/504.02 |
| 5,635,639 | * | 6/1997 | Grieff et al. ...................... 73/504.04 |
| 5,712,426 | * | 1/1998 | Sapuppo et al. .................. 73/504.03 |
| 5,912,528 | * | 6/1999 | Kumada ............................ 310/353 |

FOREIGN PATENT DOCUMENTS 0 634 629 A1  1/1995  (EP) .

* cited by examiner

Primary Examiner—Richard A. Moller
(74) Attorney, Agent, or Firm—Burr & Brown

(57) ABSTRACT

A vibrator including a loop-shaped vibration system 2, another vibration system 3A, 5A and 5B vibrating independently from the system 2, and connecting portions 4A and 4B. Exciting means for exciting driving vibration in the vibrator is provided in one of the loop-shaped vibration system and another vibration system, and detecting means for detecting detection vibration induced in the vibrator, when it is turned, is provided in the other of the systems, to provide a vibratory gyroscope.

37 Claims, 20 Drawing Sheets

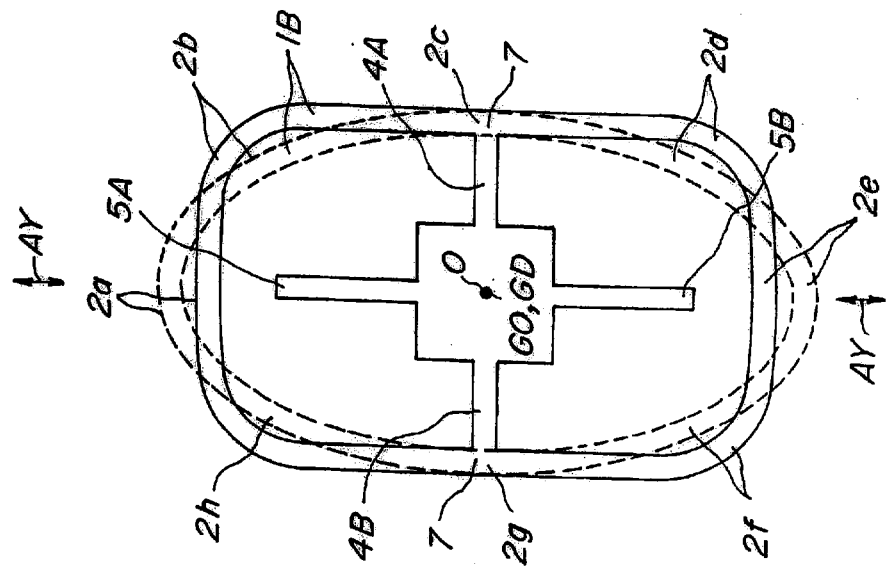
FIG._1a
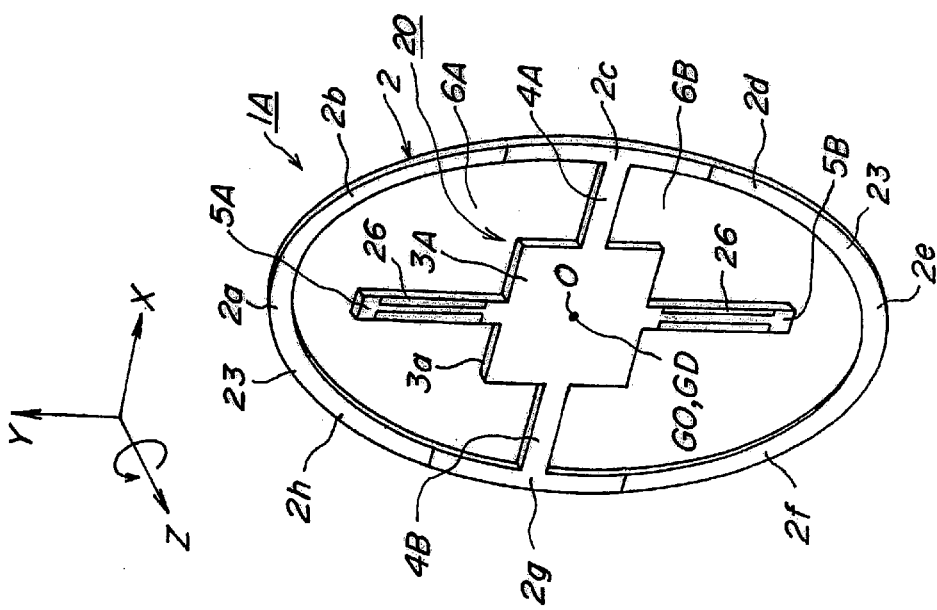
FIG._1b

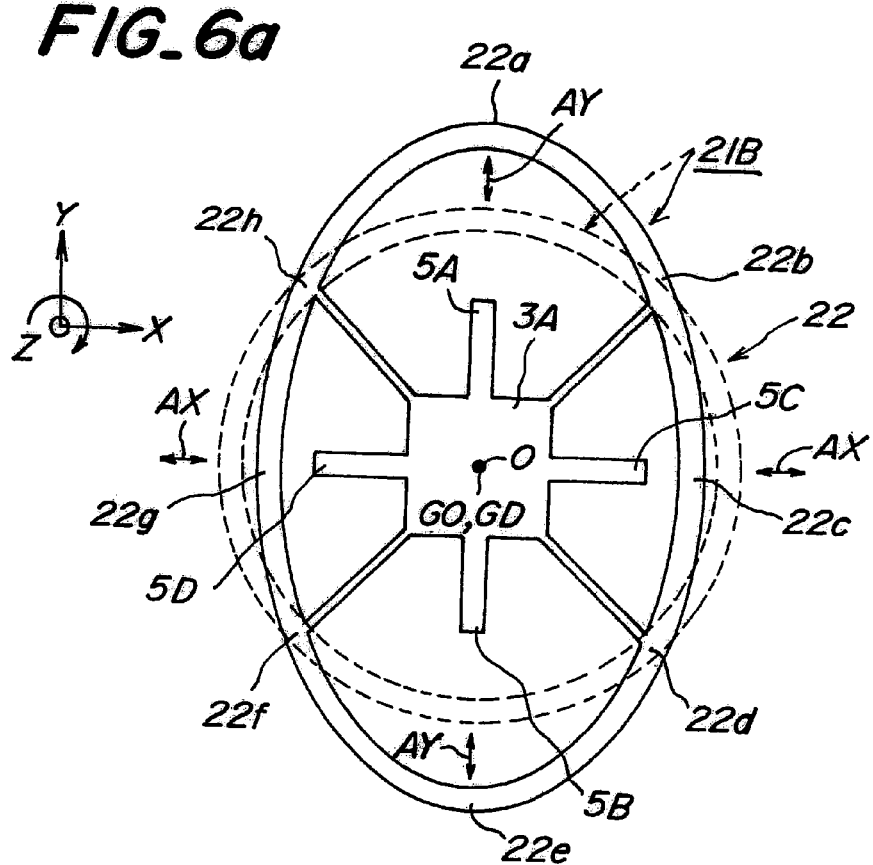
FIG_6a
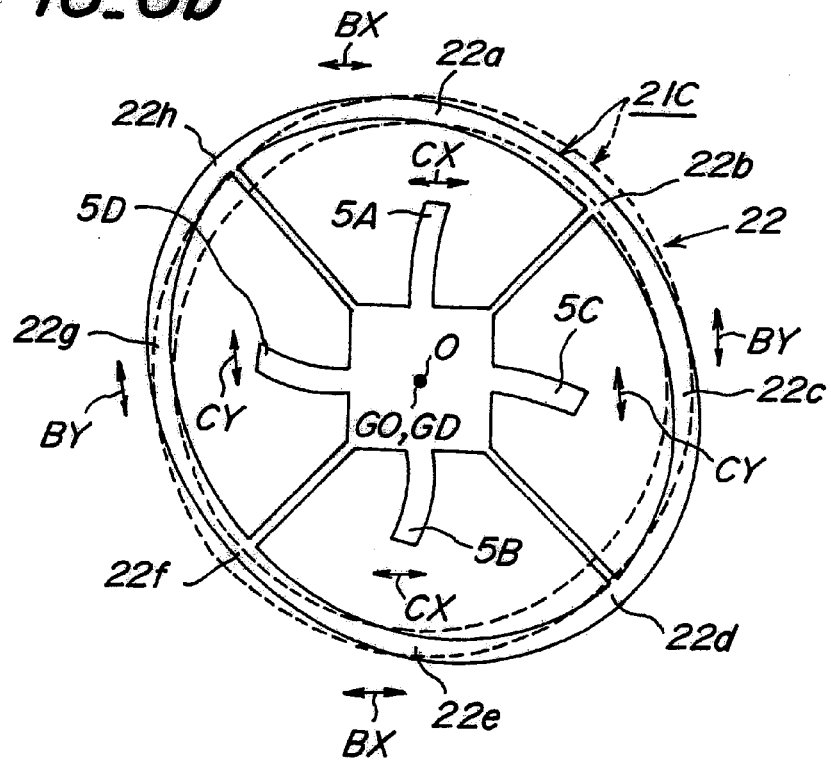
FIG_6b

FIG_7a
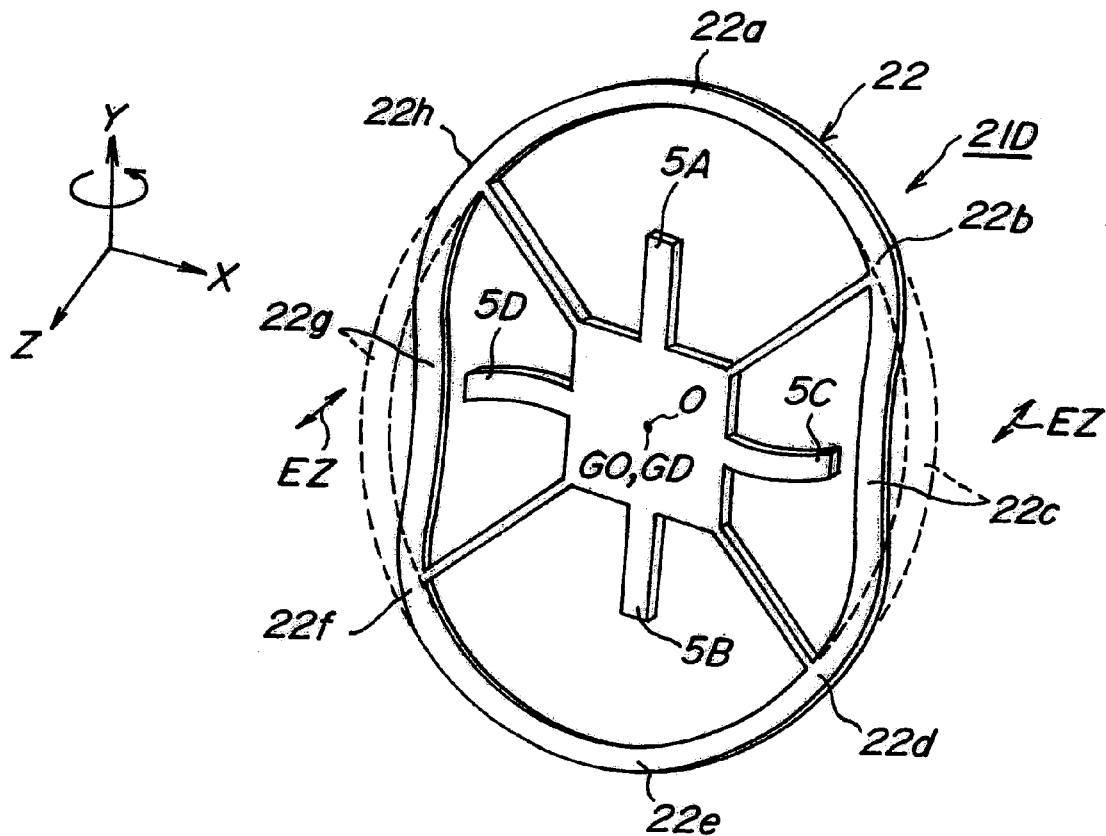
FIG_7b
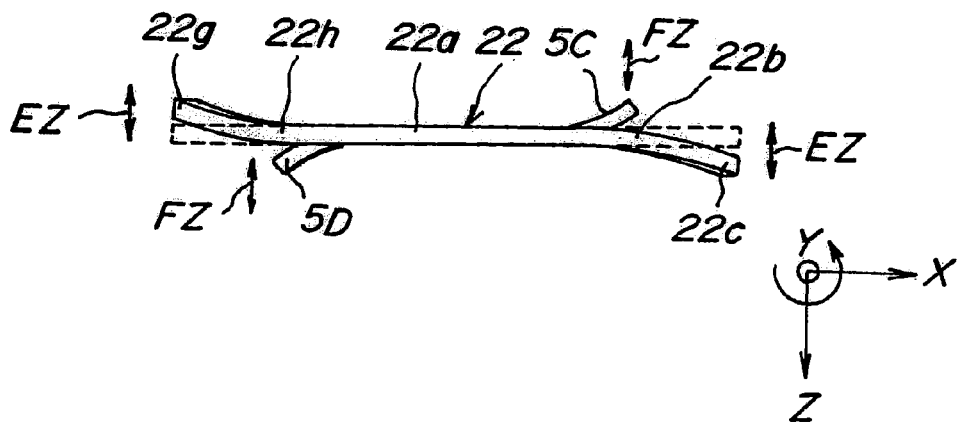

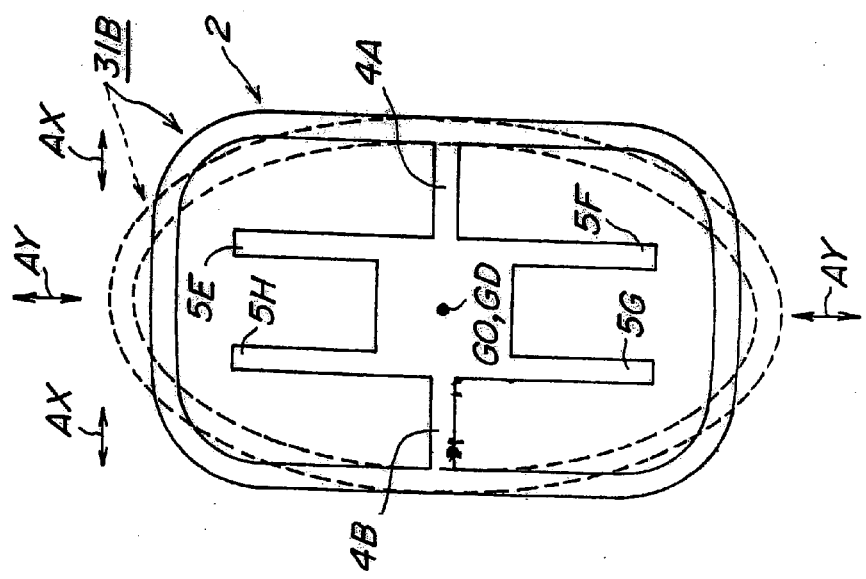
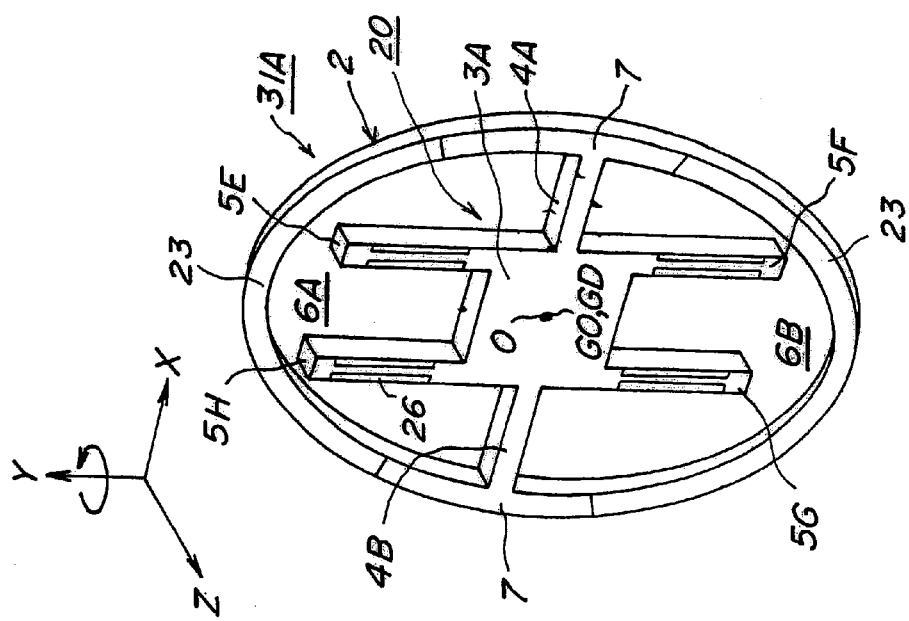

FIG_9a
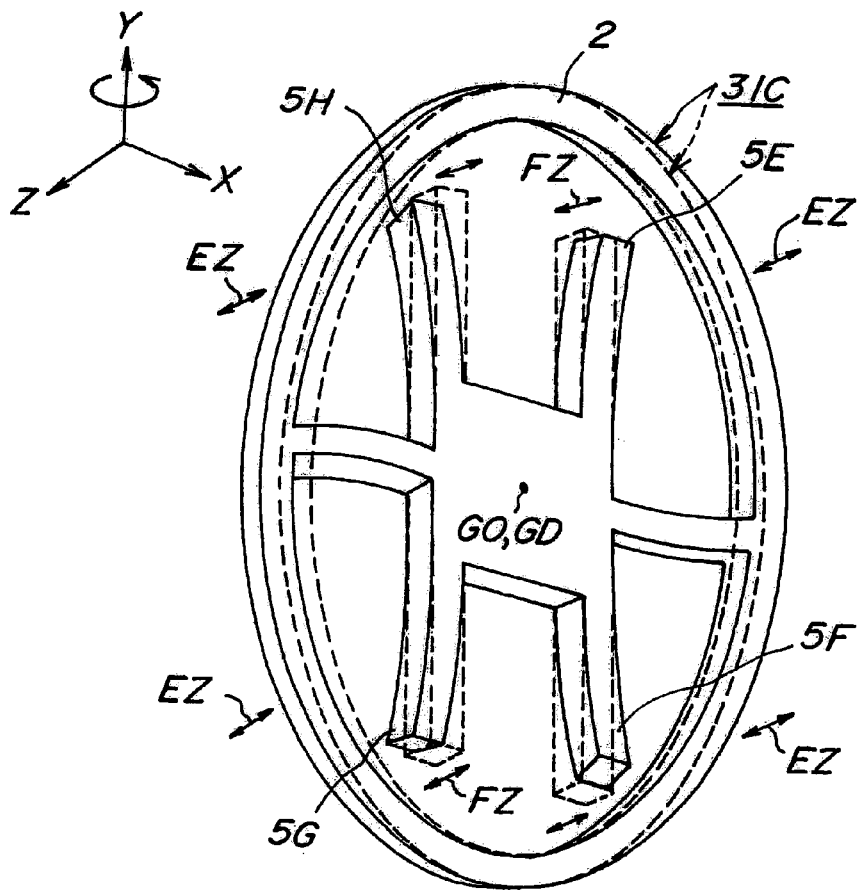
FIG_9b
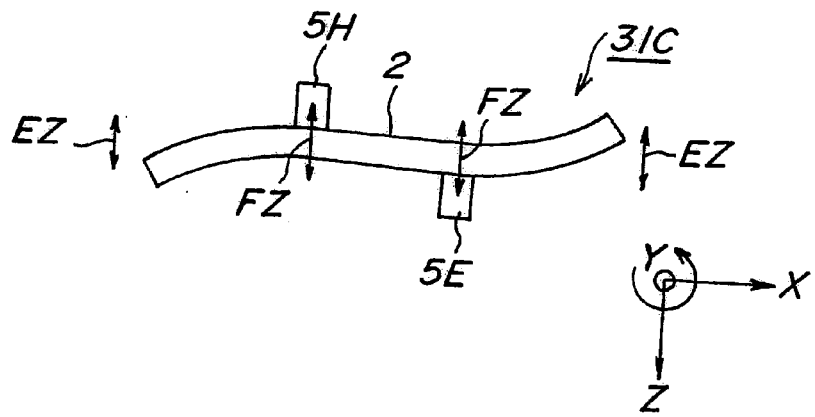

FIG_12

FIG_13

FIG_15

FIG_16

VIBRATORS VIBRATORY GYROSCOPES A METHOD OF DETECTING A TURNING ANGULAR RATE AND A LINEAR ACCELEROMETER

BACKGROUND OF THE INVENTION

1. Field of the Invention

The present invention relates to a vibrator for an angular rate sensor used for detecting a turning angular rate in a turning system, a vibratory gyroscope using the vibrator, a linear accelerometer and a method for detecting a turning angular rate.

2. Description of the Related Art

Up to now, as an angular rate sensor used for detecting a turning angular rate in a turning system, a vibratory gyroscope using a piezoelectric member has been used for detecting position of an aircraft, a ship, or a space satellite. Recently, it is used in a car-navigation system, a movement detecting mechanism in a VTR or a still camera in the field of public livelihood.

Such a vibratory gyroscope utilizes the concept that, when an angular rate is applied to a vibrating object, Coriolis force is generated in the direction perpendicular to the vibratory direction. Its mechanism is analyzed by using a dynamic model (for example, "Handbook of Elastic Wave Device Technologies" (Danseiha-Sosi Gijutsu Handbook) issued by Ohm, Inc., pp.491 to 497). Various kinds of piezoelectric vibratory gyroscopes have been proposed up to now. For example, a Sperry tuning-fork gyroscope, a Watson tuning-fork gyroscope, a regular-triangle prism-shaped tuning-piece gyroscope, a cylindrical tuning-piece gyroscope are known as a piezoelectric vibratory gyroscope.

This type of vibratory gyroscope utilizing a disk-shaped vibrator was disclosed, for example, in U.S. Pat. No. 5,540, 094, in which driving vibration, for example with four nodes, was excited in the disk-shaped vibrator, the vibrator was then turned around an axis perpendicular to the disk-shaped vibrator to induce detection vibration, whose amplitude was detected. Such induced detection vibration also comprises four nodes within.

SUMMARY OF THE INVENTION

However, such a vibrator does not necessarily have sufficiently high sensitivity. Moreover, noise, inevitably induced by the driving vibration, tends to impede the necessary detection vibration. As a result, the contribution of the amplitude of the detection vibration is accurately separated from all the detection signal including the noise only with great difficulty. Such difficulty of separation also lowers the sensitivity and the signal/noise ratio.

The inventors are studying various applications of vibratory gyroscopes, and, for example, have tried to use a vibratory gyroscope as a turning rate sensor used in a automobile body control system applying a turning rate feedback method. Such a system detects the direction of a steering wheel itself by a turning angle of the steering wheel. At the same time, the system detects a turning rate of the actually turning car body by means of a vibratory gyroscope. The system then finds a difference between the direction of the steering wheel and the actual body turning rate by comparing them with each other, and attains stable body control by compensating a wheel torque and a steering angle on the basis of this difference.

However, most conventional piezoelectric vibratory gyroscopes can detect a turning angular rate only when the vibrator is arranged in parallel with the axis of turning (what is called "vertical arrangement"). The turning axis of a turning system to be measured is usually perpendicular to the gyroscope mounting part. Accordingly, when mounting such a gyroscope, it has been impossible to shorten the gyroscope in height, namely, to reduce the gyroscope in size in the direction of the turning axis.

An object of the invention is to provide a vibratory gyroscope and vibrator having a high sensitivity and signal/noise ratio and based on a novel principle.

The invention provides a vibrator comprising a primary loop-shaped vibration system, another vibration system vibrating independently from the loop-shaped vibration system, and a connecting portion connecting the loop-shaped vibration system and another vibration system.

The invention also provides a vibratory gyroscope for detecting an angular turning rate in a turning system, comprising the above vibrator, an exciting means for exciting driving vibration in the vibrator and provided in one of the primary loop-shaped vibration system and said another vibration system, and a detecting means for detecting detection vibration occurring in the vibrator when the vibrator is turned and provided in the other of the loop-shaped vibration system and another vibration system.

The invention also provides a method for detecting a turning angular rate in a turning system using the above vibrator, comprising:

providing an exciting means in one of the loop-shaped vibration system and said another vibration system, providing a detecting means in the other of the loop-shaped vibration system and said another vibration system, exciting driving vibration in the vibrator by the exciting means, and detecting detection vibration induced in the vibrator when turning the vibrator by the detecting means.

The invention also provides a linear accelerometer for measuring a linear acceleration, comprising the above vibrator, and a detecting means for detecting the deformation of the vibrator induced by Newton's force effected on the vibrator when the vibrator is subjected to a movement in a linear acceleration.

The inventors have researched about a principle of the vibration of a vibrator to be used for a vibratory gyroscope, and have developed a vibrator and vibratory gyroscope based on a novel principle.

That is, the inventors developed the following idea. By providing a vibrator with a loop-shaped vibration system, another vibration system vibrating independently from the loop-shaped vibration system, and a connecting portion connecting the above systems, the vibration components of the loop-shaped and another vibration systems may be effectively separated, and driving vibration may be excited in one of the vibration systems and detecting vibration may be induced in the other. For example, when driving vibration is excited in the loop-shaped vibration system and the vibrator is not turned around a specified axis (an angular turning rate is 0), another vibration system may not substantially vibrate. When the vibrator is turned, Coriolis force is effected on the loop-shaped vibration system responding to the driving vibration to induce detection vibration in the vibrator. The detection vibration is detected in another vibration system.

"Another vibration system may not substantially vibrate" includes that the vibration induced in another vibration system has an amplitude not higher than $1/1000$ of the maximum amplitude of the driving vibration.

In prior vibratory gyroscopes, driving vibration excited in a driving vibration arm affected a detection arm in a certain manner, causing some stress within it to induce some noises in the detection signal. Moreover, the above described prior vibratory gyroscope using a disk-shaped vibrator has relatively low sensitivity and signal/noise ratio, because driving vibration induces inner-stress within the vibrator. According to the invention, such noise inevitably induced in a detection signal may be reduced or prevented. Thus the invention provides a solution to the above problem inherent in a vibratory gyroscope.

In the invention, the loop-shaped vibration system and another vibration system may preferably be extended in a specified plane. In this embodiment, the systems may be extended or formed within a certain thickness containing the specified plane. The thickness may be easily determined and understood by those having ordinary skill in the art and may preferably be not higher than 1 mm. In this embodiment, the vibrator may comprise another portion or portions other than the loop-shaped and another vibration systems, and another portion may be protruded, although the whole vibrator may preferably be formed in the specified plane in the above meaning.

The loop-shaped vibration system has a geometrical shape of a loop and does not necessarily have a circular shape, although the system may preferably have a circular or an elliptical shape. Moreover, the center of gravity of the loop-shaped vibration system may preferably be located substantially at or in the vicinity of center of gravity of the whole vibrator (located substantially in a circle having the center of gravity of the whole vibrator as its center and a diameter of 1 mm). Thereby, driving vibration components excited in the loop-shaped vibration system may cancel each other, thus further reducing the influence of the driving vibration exerted on another vibration system for detecting detection vibration.

As described above, the invention provides a vibratory gyroscope and vibrator having a high sensitivity and signal/noise ratio based on a novel principle.

BRIEF DESCRIPTION OF THE DRAWINGS

FIG. 1(a) is a perspective view showing a vibrator 1A,

FIG. 1(b) is a front view showing the driving vibration 1B of the vibrator 1A,

FIG. 6(a) is a front view showing the driving vibration 21B of the vibrator 21A, FIG. 6(b) is a front view of the detection vibration 21C of the vibrator 21A, FIG. 7(a) is a perspective view showing the detection vibration 21D of the vibrator 21A, FIG. 7(b) is a top plan view of the detection vibration 21D, FIG. 8(a) is a perspective view showing a vibrator 31A, FIG. 8(b) is a front view showing the driving vibration 31B of the vibrator 31B, FIG. 9(a) is a perspective view showing the detection vibration 31C of the vibrator 31A, FIG. 9(b) is a top plan view showing the detection vibration 31C.

DESCRIPTION OF THE PREFERRED EMBODIMENTS

In an embodiment of the invention, another vibration system includes an inner vibration system formed in the primary loop-shaped vibration system, and the inner vibration system comprises a base portion, having an outer edge portion and connected with the primary loop-shaped vibration system, and a bending vibration piece or pieces extending from the outer edge portion towards the primary loop-shaped vibration system with respect to the center of gravity of the vibrator. In this embodiment, an exciting means is formed in one of the loop-shaped vibration system and the bending vibration piece and a detecting means is formed in the other. FIGS. 1 to 9 are related to this embodiment.

Figure 2:
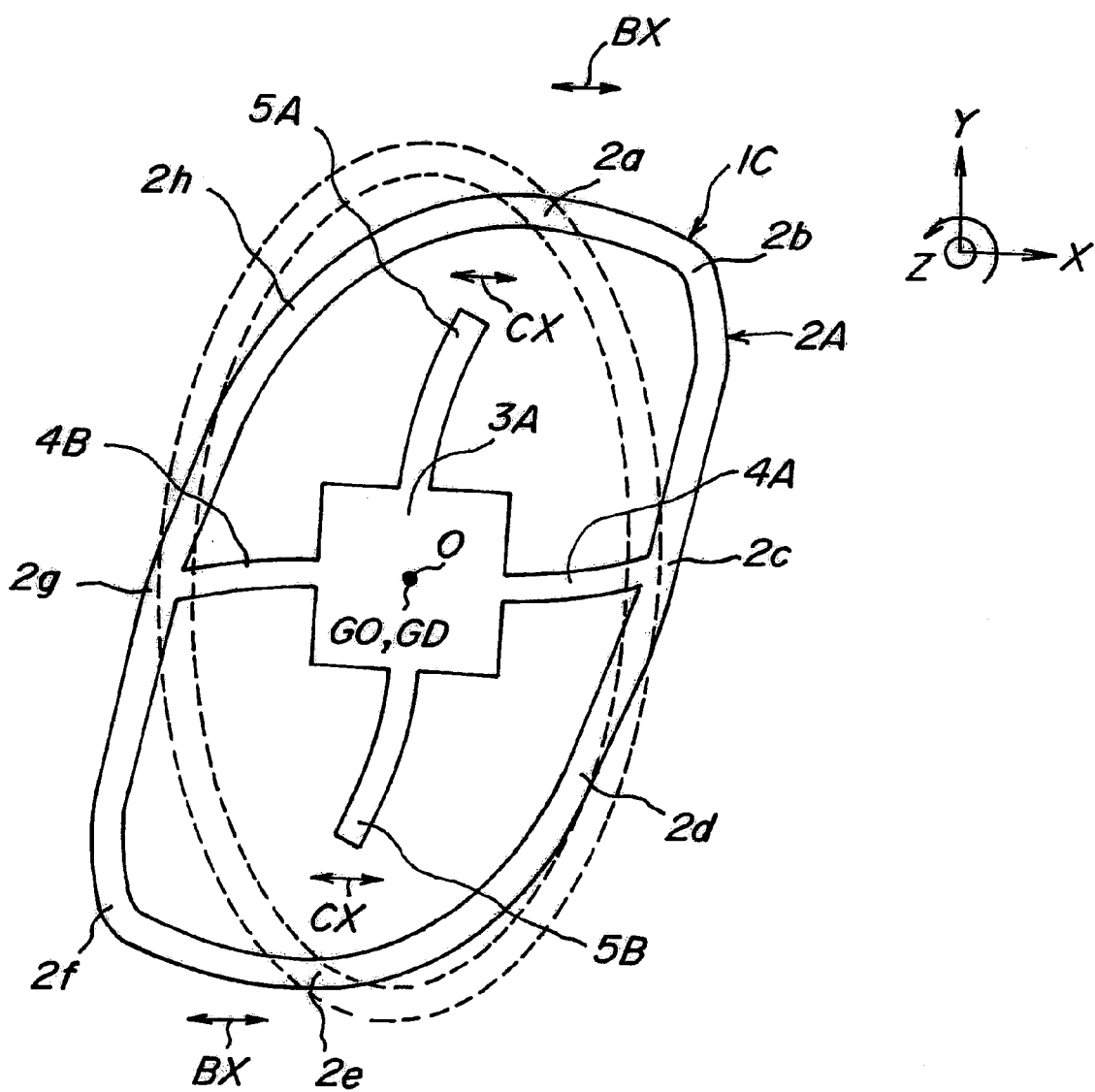
FIG. 2 is a front view showing the detection vibration 1C of the vibrator 1A.

FIG. 1(a) is a perspective view showing a vibrator 1A, FIG. 1(b) is a front view showing the driving vibration 1B of the vibrator 1A, and FIG. 2 is a front view showing the detection vibration 1C of the vibrator 1A. The vibrator of FIGS. 1 and 2 detects a turning angular rate around Z axis extending perpendicular to a specified plane.

The vibrator 1A comprises a loop-shaped vibration system 2, which has circular shape in this embodiment. A base portion 3A, for example, with tetragonal shape, is provided in the system 2. Elongated linear bending vibration pieces 5A and 5B are provided on the opposing two sides of the base portion 3A, respectively. The base portion 3A and system 2 are connected with connecting portions 4A and 4B, respectively, to form spaces 6A and 6B in the system 2. "O" is a cross point of an axis "Z" and the specified plane and therefore center of the turning. "GO" is the center of gravity of the whole vibrator (when it is not turned), and "GD" is the center of vibration of the driving vibration of the vibrator. 3a is an outer edge portion of the base portion 3. Base portion 3A and pieces 5A, 5B constitute another vibration system 20

Driving electrodes 23 are positioned on vibration system 2 and detecting electrodes 26 are positioned on pieces 5A and 5B of another vibration system 20.

As shown in FIG. 1(b), driving vibration is excited in the system 2 and it bending vibrates, i.e. vibrates in the bending mode. The amplitude of the driving vibration is relatively small in 2c and 2g, 2a, 2b and 2h vibrate as shown as arrows AY, and 2d, 2e and 2f also vibrate as arrows AY in the same manner. When the vibrator 1A is turned around the axis "Z", the detection vibration 1C is excited as shown in FIG. 2. In the vibration mode 1C, for example, 2a and 2e vibrate as arrows BX in the inverse phases. Responsive to the movements, a bending vibration component CX is induced in each piece 5A or 5B, in which stress is induced. This stress is detected by a known detecting means.

In such vibrator and vibratory gyroscope, driving vibration and detection vibration are induced within the specified plane. As a result, when the vibrator is located so as to extend within a plane crossing with the turning axis, it is possible to detect a turning angular rate in a sufficiently high sensitivity without providing a protrusion of a specified weight, the protrusion extending in a direction of the turning axis. Such advantage may be applied to the following vibrators which detect a turning angular rate around the Z axis.

The bending vibration piece extending from the base portion to the loop-shaped vibration system may be one and preferably plural, and most preferably, a plurality of the pieces are provided in positions which are substantially identical with each other after turning them around the center of gravity "GO" of the vibrator. For example, in FIGS. 1 and 2, the pieces 5A and 5B are provided in positions which are diad-symmetrical with each other around the center of gravity "GO".

As described above, bending vibration pieces are provided centrosymmetrically in positions being substantially identical with each other after turning them around the center of gravity of the vibrator, that is, a plurality of vibration pieces of interest are distant from each other the same predetermined angle around the center of gravity in the specified plane.

Therefore, when one vibration piece is turned a predetermined angle around "GO" in the specified plane, the piece is located in a position of the adjacent bending vibration piece. For example, in FIG. 1, the pieces 5A and 5B are distant from each other 180° C., therefore, the piece 5A is located in the position of the piece 5B after the piece 5A is turned 180° C. The bending vibration pieces may preferably be provided in positions being diad-, triad-, or quad-symmetrical.

The center of gravity "GD" of the driving vibration may preferably be on the center "GO" of gravity of the whole vibrator, or in the vicinity of the center "GO" (in a circle with the center "GO" as its center and a diameter of 1 mm). The driving vibration components in the loop-shaped vibration system cancel each other to further reduce the influence of the driving vibration on the inner vibration system.

In actually manufactured vibratory gyroscopes, the turning axis may intersect the specified plane at a certain angle other than the right angle. In this case, the above described detection method may be applied to an turning angular rate around the axis Z, which is perpendicular to the specified plane. However, an angle at which the turning axis intersect the specified plane is too different from the right angle, the sensitivity is reduced. Therefore, the turning axis may preferably intersect the specified plane at an angle of 60 to 120°, and more preferably be 85 to 95°, and most preferably be right angle.

While, in FIG. 1, the center of turning "O" (a crossing point of the turning axis and specified plane) is identical with the center of gravity "GO" of the vibrator and center of gravity "GD" of the whole driving vibration, the center of turning "O" is not necessarily identical. Because, when the center of turning "O" is not identical with the center of gravity "GO", or even when the center of turning "O" is located outside of the vibrator, the inventive vibrator may be useful and applicable to the inventive gyroscope.

The reason is described below. When turning the vibrator, a displacement of each portion of the vibrator, where the center of turning "O" is not identical with the center of gravity "GD", is a vector sum of a displacement of each portion of the vibrator, where the center of turning "O" is identical with the center of gravity "GO" (the displacement is due to the turning), and a displacement due to translational movement of each portion thereof. Coriolis force does not apply on the displacement due to the translational movement and does not induce any effect on the detection of a turning angular rate by the vibratory gyroscope.

Materials of the inventive vibrator will be described below.

The whole inventive vibrator may be made of the same single crystal. In this case, the vibrator can be made by making a single crystal thin plate which is then processed by means of etching or grinding. Each portion of the vibrator may be made of different materials, although the whole vibrator may preferably be an integral body.

When forming the vibrator by an etching process from a thin plate, for example a thin plate made of a piezoelectric single crystal such as quartz, a projection of a particular shape, such as an elongated projection, may be formed on the surface of each constituent piece, such as a bending vibration piece, of the vibrator. Such projection might change the symmetrical shape of the design of the vibrator. However, such projection may be present in the vibrator. The height of the projection may preferably be lower, for example not higher than 1/5 of the width of constituent piece with the projection formed, generally causing substantially no adverse effects. This may be true when the other portion changing the symmetrical design other than the projection exists within the vibrator, which portion may be produced during a process other than etching.

When the portions such as projections exist within a vibrator, a part of the projection may be deleted or the other portions of the vibrator may be deleted by means of a laser processing so that the shape of the vibrator may be adjusted, and preferably, the centers of gravity of the loop-shaped vibration system, bending vibration pieces, whole of driving vibration and whole of detection vibration may be located in the vicinity of the center of gravity "GO" of whole vibrator.

Although a material for the vibrator is not limited in particular, it is preferable to use a single crystal of quartz, $LiNbO_3$, $LiTaO_3$, a solid solution of lithium niobate-lithium tantalate ($Li(Nb, Ta)O_3$), lithium tetraborate and langasite.

Among the above-mentioned single crystals, single crystals of LiNbO3, LiTaO3 and a solid solution of lithium niobate-lithium tantalate have particularly large electromechanical coupling coefficients. Comparing a single crystal of LiNbO3 and a single crystal of LiTaO3 with each other, the single crystal of LiTaO3 has a larger electromechanical coupling coefficient and a better thermal stability than the single crystal of LiNbO3.

The sensitivity of the inventive vibrator may be improved and its detection noise may be reduced by using a piezoelectric single crystals an its material. Moreover, it is possible to provide the vibrator resistive to temperature changes by applying a piezoelectric material. Such a vibrator is suitable for a sensor used in a car, which sensor needs thermal stability. This point will be further described.

Prior angular rate sensors using tuning-fork vibrators include a piezoelectric vibratory gyroscope disclosed in Japanese laid-open publication Tokkaihei No. 8-128833. In such a vibrator, however, the vibrator vibrates in two directions. Therefore, particularly in case of forming the vibrator out of such a single crystal as described above, it is necessary to match the characteristics of the single crystal in the two directions with each other. In practice, however, a piezoelectric single crystal is anisotropic.

Generally in a piezoelectric vibratory gyroscope, in order to keep a good sensitivity, it is required to keep a constant vibration frequency difference between a natural resonance frequency of a drive vibration mode and a natural resonance frequency of a detection vibration mode. However, a single crystal is anisotropic and a degree of variation in vibration frequency caused by a temperature change varies with the crystal face. For example, although variation in vibration frequency caused by a temperature change is very little in case of cutting a single crystal along a specific crystal face, variation in vibration frequency is very sensitive to a temperature change in case of cutting the single crystal along another crystal face. Thus, in case that a vibrator vibrates in two directions, at least one of the two vibrating faces is a crystal face having a large variation in vibration frequency caused by a temperature change.

Therefore, by making the whole of a vibrator vibrate in a specified plane and forming the vibrator out of a piezoelectric single crystal, it is possible to prevent the vibrator from being influenced by anisotropy of a single crystal as described above and use only the best crystal face in characteristics of the single crystal in the vibrator.

That is, since every vibration of a vibrator takes place in a single plane, it is possible to manufacture a vibrator using only a crystal face having little variation in vibration frequency caused by a temperature change of a single crystal. Therefore, it is possible to provide a vibratory gyroscope having a very high thermal stability.

When the inventive vibrator is formed of a piezoelectric material, the vibrator is provided with a driving electrode and detection electrode. The piezoelectric material includes a piezoelectric ceramics such as PZT other than the above piezoelectric crystals.

The inventive vibrator may be formed of an invariable elasticity metal such as elinvar. In this case, piezoelectric bodies are provided on predetermined positions of the vibrator.

The inventive vibrator may be produced by a silicon semiconductor process as used in a micromachine made of silicon, other than the piezoelectric material or the invariable elastic metal. In such gyroscope, electrostatic force may be used for driving the vibrator.

An electrostatic detecting electrode may be used for driving the vibrator. Instead of the electrode, a semiconductor doping domain doped with a specific metal may be provided in the vibrator. Such domain may act as a piezoelectric resistance device. A change in resistance is caused by a stress applied to each piezoelectric resistance device in each bending vibration piece when turning the vibrator, the change being detected as an index of a turning angular rate.

Figure 3:
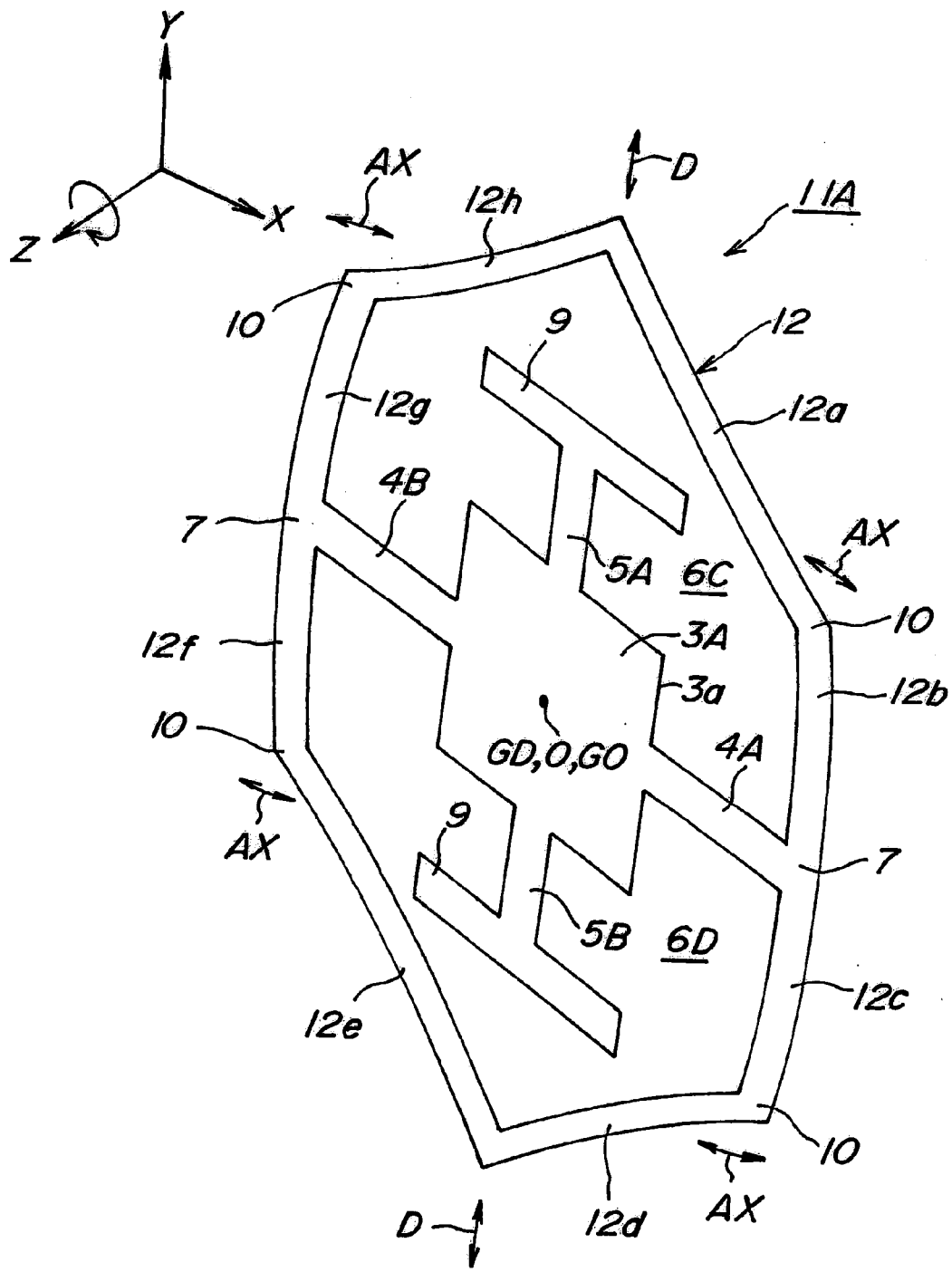
FIG. 3 is a perspective view showing the driving vibration of a vibrator 11A.
Figure 4:
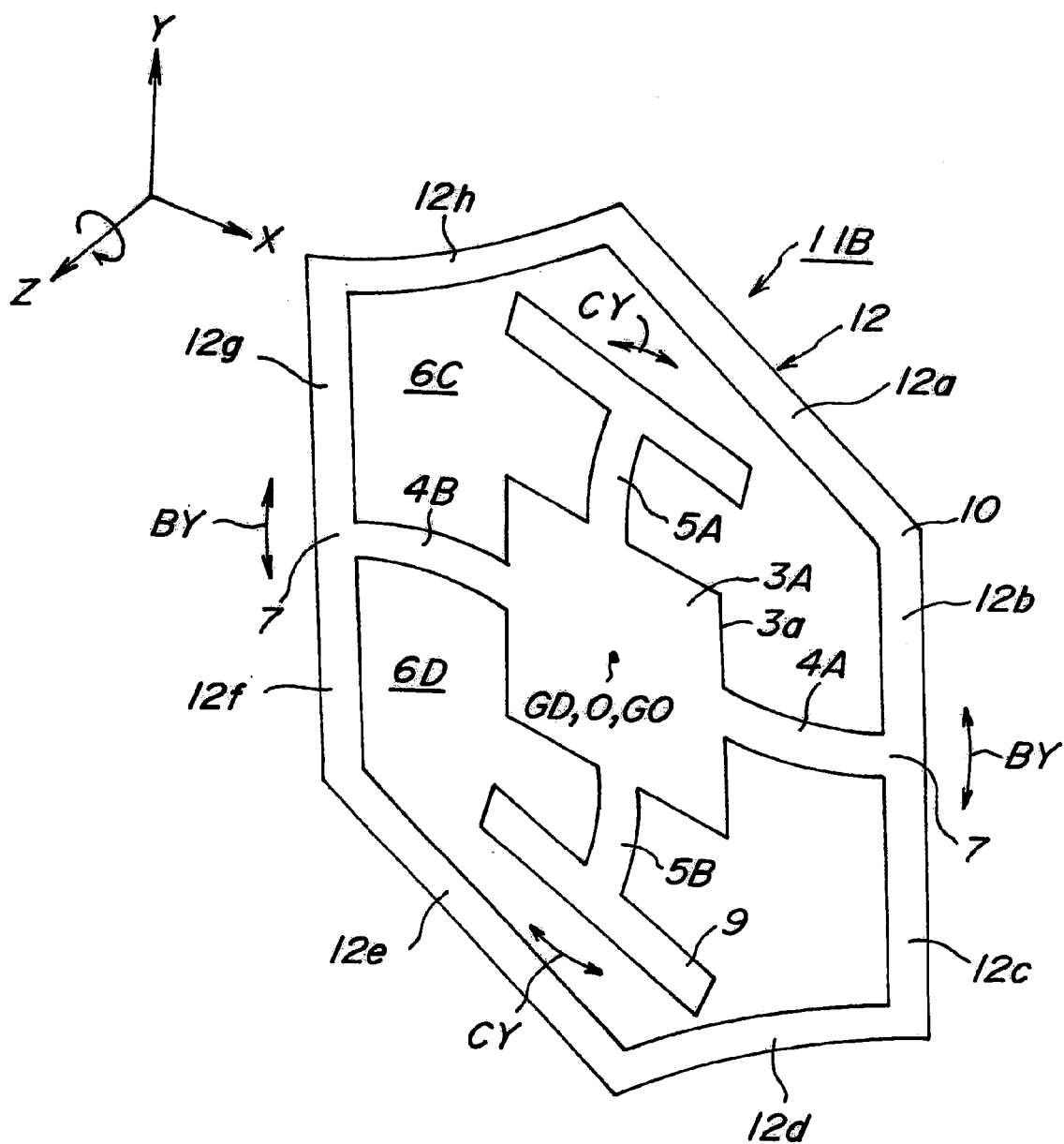
FIG. 4 is a perspective view showing the detection vibration 11B of the vibrator 11A.

FIG. 3 is a perspective view showing a vibrator 11A (its driving vibration), and FIG. 4 is a perspective view showing the detection vibration of the vibrator of FIG. 3. The vibrator of FIGS. 3 and 4 detects a turning angular rate around Z axis.

The vibrator 11A has a vibration system 12 with a loop-shape having several corners. A base portion 3A is provided in the system 12. Linear elongated bending vibration pieces 5A and 5B are provided on two opposing sides of the base portion 3A, respectively. A weight portion 9 is provided in the outer edge of each piece 5A or 5B. The base portion 3A and system 12 are connected with each other by connecting portions 4A and 4B, to form spaces 6C and 6D in the system 12. Parts 3A, 5A and 5B form another vibration system 20.

A bending vibration piece 12b, 12c, 12g or 12f is provided in the outer edge of each connecting portion 4A or 4B, and intersects each connecting portion substantially at the right angle. 7 is a connecting or crossing part of the loop-shaped vibration system 12 and the connecting portion. The pieces 12b and 12g are connected by connecting portions 12a and 12h, and the pieces 12c and 12f are connected by connecting portions 12d and 12e. 10 is a connecting or crossing part of the pieces.

As shown in FIG. 3, driving vibration is excited in the system 12 as arrows AX and D. A pair of pieces 12b and 12c, and a pair of pieces 12f and 12g bending-vibrate as shown in arrows AX in inverse phases with each other. As a result, the vibration shown by arrows D is induced.

When the vibrator is turned around a turning axis Z, detection vibration 11B shown in FIG. 4 is excited. The connecting portion 4A and 4B vibrate as shown by arrows BY in inverse phases with each other. Responsive to this vibration, a bending vibration component CY is induced in each piece 5A or 5B.

Figure 5:
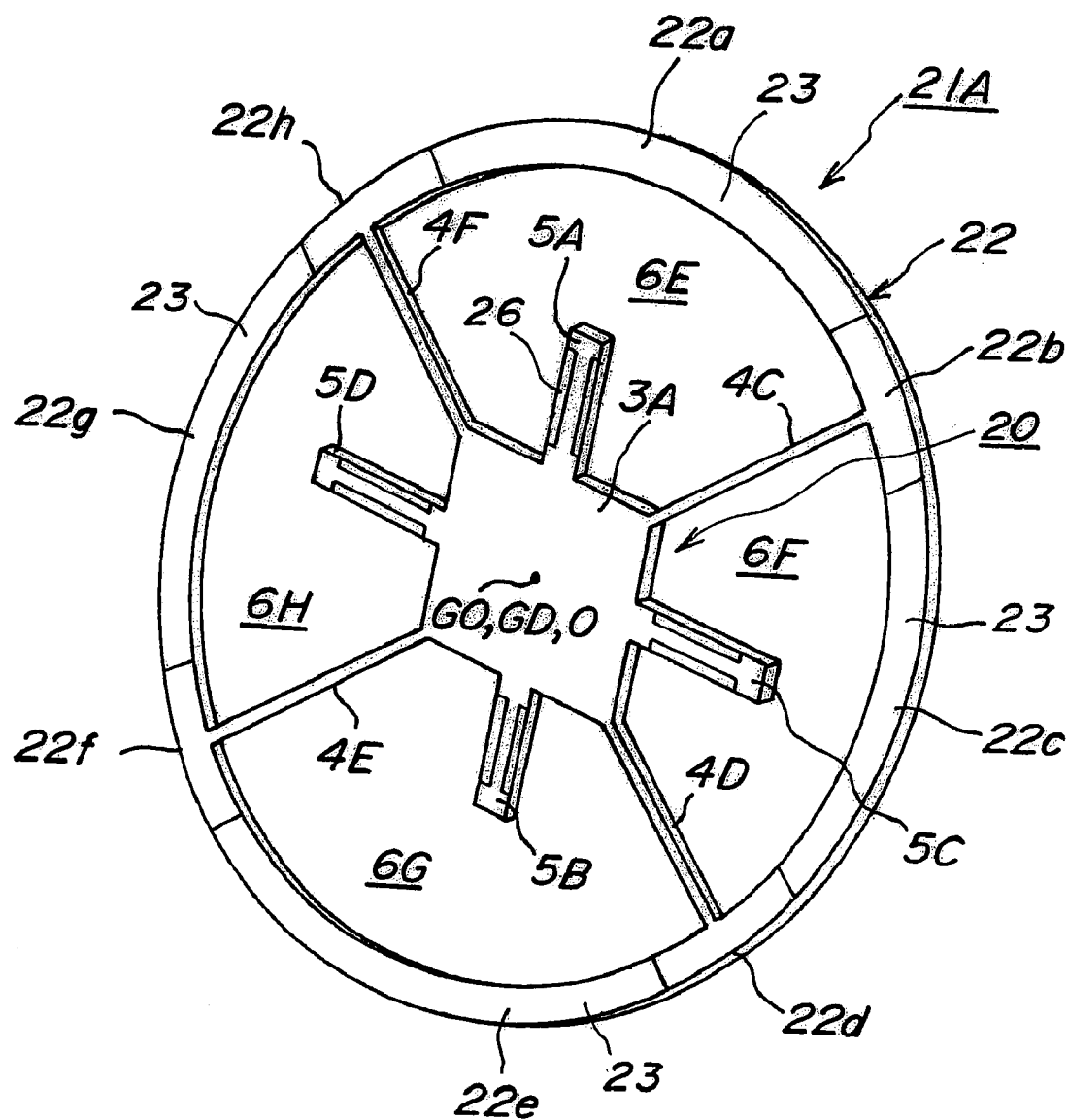
FIG. 5 is a perspective view showing a vibrator 21A.

The vibrator of FIGS. 5 to 7 may detect, addition to an turning angular rate around an axis Z, turning angular rates around turning axes X and Y parallel to the specified plane. In this case, it is necessary to detect a plane-normal vibration component perpendicular to the specified plane, of detection vibration, which is induced responding to Coriolis force effected on a vibrator 21A according to the turning around an axis X or Y. Further, using the same vibrator, both of turning angular rates around axes X and Y may be detected.

FIG. 5 is a perspective view showing a vibrator 21A, comprising a loop-shaped vibration system 22 of circular shape. A base portion 3A, for example with tetragonal shape, is provided in the system 22. A linear elongated bending vibration piece 5A, 5B, 5C or 5D is provided on each side of the base portion 3A. The base portion 3A and system 22 are connected by, for example, 4C, 4D, 4E and 4F to form spaces 6E, 6F, 6G and 6H in the system 22.

As shown in FIG. 6(a), driving vibration 21B is excited in the system 22. In this vibration, 22a and 22e vibrate as arrows AY, 22c and 22g vibrate as arrows AX, and 22b, 22d, 22f and 22h constitute nodes of the vibration. When the vibrator 21A is turned around an axis Z, detection vibration 21C is induced as shown in FIG. 6(b). That is, Coriolis force is effected in the direction perpendicular to the direction of the driving vibration at each point of the vibrator, to induce the vibration components as arrows BX and BY. Responding to the vibration components, bending vibration component CX within the specified plane is induced in each piece 5A or 5B, and bending vibration component CY within the specified plane is induced in each piece 5C or 5D, the vibration components CX and CY cause inner stress in each piece, which may be detected as electrical signal.

The turning of the vibrator 21A around an axis Y induces detection vibration 21D as shown in FIG. 7(a). That is, in the driving vibration 21B as shown in FIG. 6(a), its Y direction-vibration component AY is not influenced by this turning and its X-direction component AX induces Coriolis force. As a result, as shown in FIGS. 7(a) and (b), Z-direction vibration components as arrows EZ are induced in the vicinity of 22c and 22g of the system 22, and responsive to the components, Z-direction vibration components FZ are induced in bending vibration pieces 5C and 5D. The components FZ generate inner stress in the pieces, which may be detected as electrical signal.

Although the vibrator of FIG. 7 detects a turning angular rate around Y axis, X and Y axes are equivalent in this embodiment. Therefore, a turning angular rate around X axis may be detected in the same manner as that around Y axis. Moreover, turning angular rates around X and Y axes may be detected using the same vibrator.

The vibrator shown in FIGS. 8 and 9 may detect a turning angular rate around Y axis parallel to the specified plane. FIG. 8(*a*) is a perspective view showing a vibrator 31A, FIG. 8(*b*) is a front view showing the vibrator 31A with its driving vibration 31B, FIG. 9(*a*) is a front view showing the vibrator 31A with its detection vibration 31C, and FIG. 9(*b*) is a plan view of the vibrator of FIG. 9(*a*).

The vibrator 31A comprises a loop-shaped vibration system 2 of circular shape. A base portion 3A, for example with tetragonal shape, is provided in the system 2. Linear elongated bending vibration pieces 5E and 5H, or 5F and 5G are provided on each of two sides of the base portion 3A. Parts 3A and 5A–5G form another vibration system 20.

As shown in FIG. 8(*b*), each portion of the system 2 is vibrated as arrows AX, AY. The turning of the vibrator 31A around Y axis excite detection vibration 31C as shown in FIG. 9(*b*). That is, Y-direction vibration components AY of the driving vibration 31B are not influenced by the turning, while its X-direction vibration components AX induce Coriolis force. As a result, as shown in FIGS. 9(*a*) and (*b*), Z-direction vibration components as arrows EZ are induced in the system 2, and responsive to the components, Z-direction vibration components FZ are induced in pieces 5E, 5F, 5G and 5H. In components FZ, the pieces 5E and 5H on the same side of the base portion vibrate in inverse phases, as well as the pieces 5F and 5G.

In another embodiment of the invention, the inventive vibrator comprises an inner vibration system consisting of a plate shaped vibration system, in which driving vibration is excited or detection vibration is induced when the vibrator is turned. In this embodiment, the plate shaped vibration system may be second loop-shaped vibration system, which may vibrate in bending motion. Alternatively, the plate shaped vibration system may be a disk-shaped vibrator, which may vibrate in expansion and contraction motion.

The loop-shaped vibration system may be provided with a bending vibration piece or pieces extending radially, with respect to the center of gravity of the vibrator from the outer edge of the loop-shaped vibration system, and/or, a bending vibration piece or pieces extending radially, with respect to the center, from the inner edge of the loop-shaped vibration system towards the center. Such bending vibration pieces may preferably be provided in positions substantially identical with each other after turning them around the center of gravity of the vibrator. Such preferred positions were described above.

Figure 10:
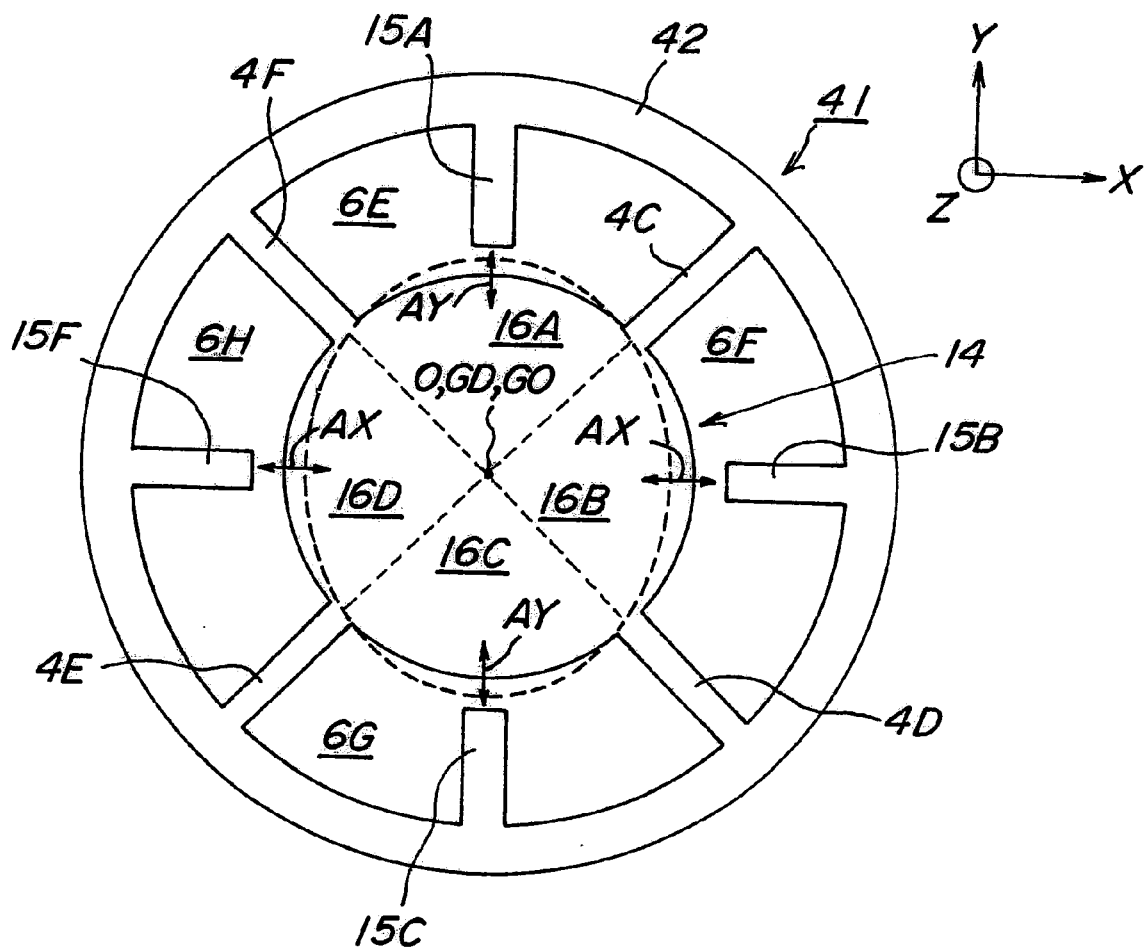
FIG. 10 is a front view showing a vibrator 41 and its driving vibration.

FIG. 10 is a front view showing a vibrator 41, which comprises a loop-shaped vibration system 42 having circular shape. A plate and disk shaped vibration system 14 is provided in the system 42. The systems 14 and 42 are connected with, for example, four connecting portions 4C, 4D, 4E and 4F to form spaces 6E, 6F, 6G and 6H in the system 42. Four bending vibration pieces 15A, 15B, 15C and 15D are formed so as to extend inwardly from the system 42 toward the center and are located in positions which are quad-symmetrical with respect to the center of gravity of the vibrator.

In the embodiment, the plate shaped vibration system 14 is used as a vibrator for exciting driving vibration. That is, driving vibration is excited as arrows AX and AY. In this driving vibration, for example, when the disk-shaped vibrator 14 is divided circumferentially into four regions 16A to 16D, the regions 16A and 16C vibrate in the direction of Y axis and the regions 16B and 16D vibrate in the direction of X axis. The boundaries of the adjacent regions are nodes of the driving vibration. The plate shaped vibration system 14 vibrates in expansion and contraction motion.

Figure 11:
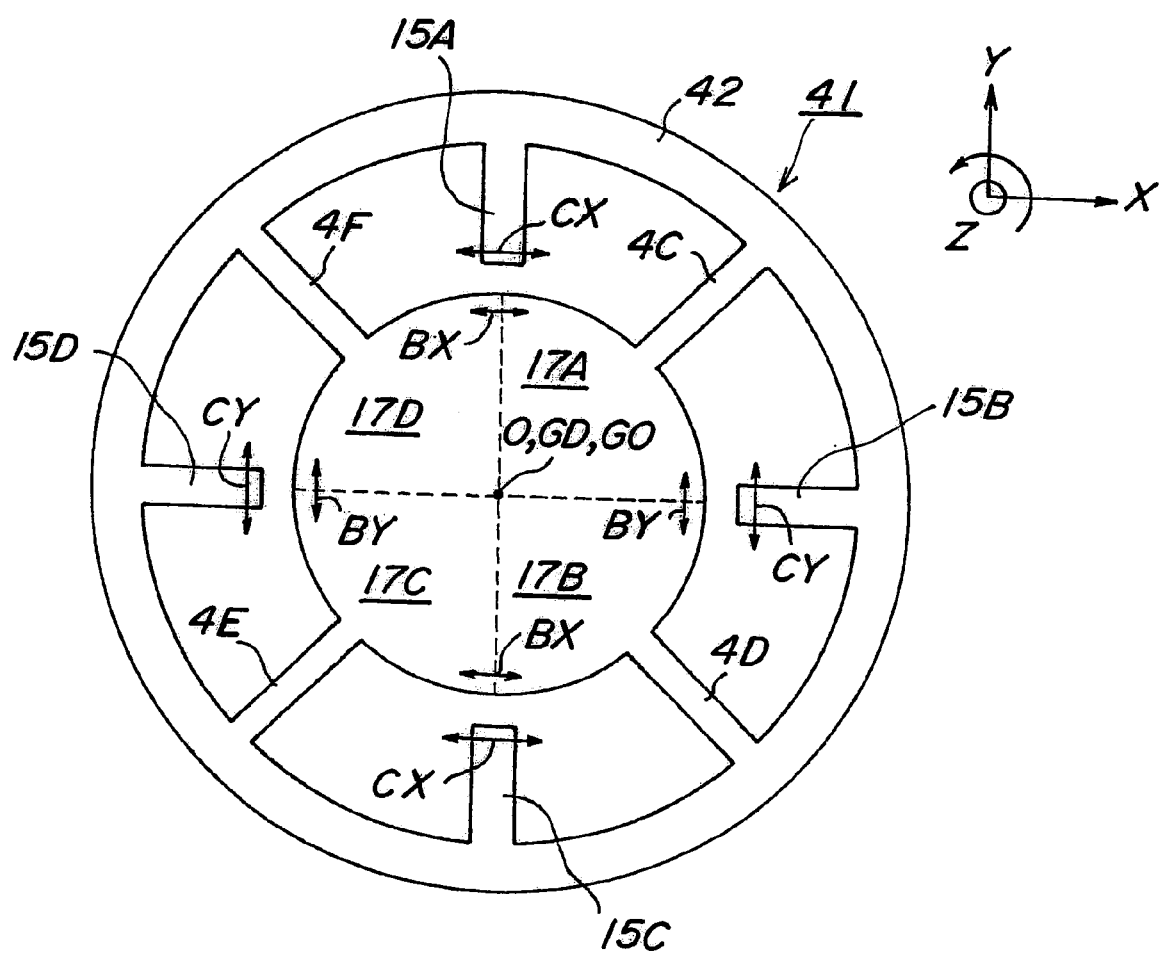
FIG. 11 is a front view showing the detection vibration of the vibrator 41, when it is turned around Z axis.

When the vibrator 41 is turned around the turning axis Z, as shown in FIG. 11, Coriolis force is effected on the vibrator in directions perpendicular to the directions of the driving vibration to induce vibration components BX and BY in the system 14. Its nodes are shown in boundaries between the adjacent regions 17A, 17B, 17C and 17D located in positions which are 45° different from the positions of the regions 16A to 16D. Responsive to this, bending vibration components CX are induced within the specified plane in bending vibration pieces 15A and 15C, and bending vibration components CY are induced within the specified plane in bending vibration pieces 15B and 15D. The components induce inner stress in pieces, which may be detected as electrical signal.

Figure 12:
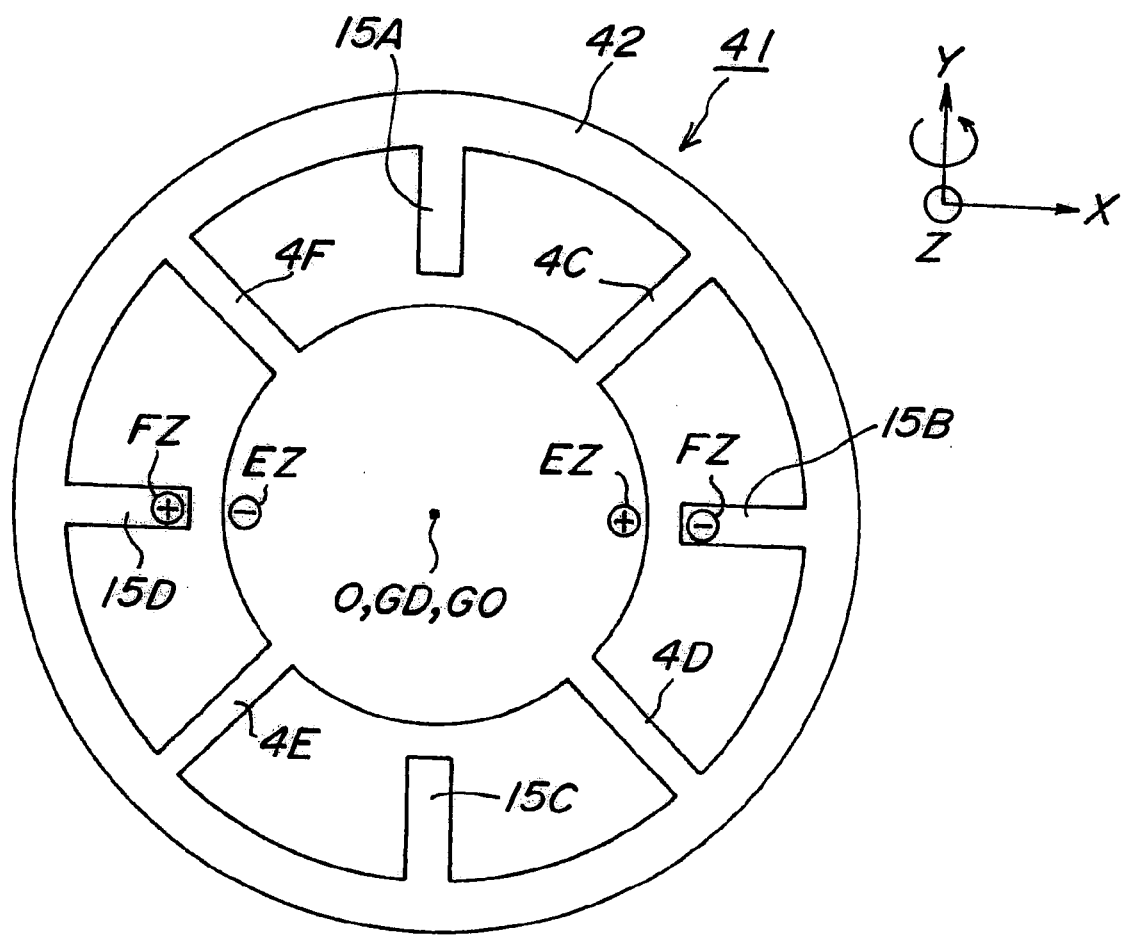
FIG. 12 is a front view showing the detection vibration of the vibrator 41, when it is turned around Y axis.

The turning of the vibrator 41 around a turning axis Y as shown in FIG. 12 induces detection vibration. That is, the driving vibration shown in FIG. 10 includes Y-direction vibration components AY, which are not influenced by the turning, and X-direction vibration components AX, upon which Coriolis force is effected. As a result, as shown in FIG. 12, Z-direction vibration components as arrows EZ are induced in regions of the system 14, in which X-direction driving vibration components AX are relatively large in amplitude. Responsive to the vibration components, detection vibration components FZ in Z direction are induced in pieces 15B and 15D.

Although the vibrator of FIG. 12 detects a turning angular rate around Y axis, the vibrator may also detect a turning angular rate around X axis by detecting the vibration components induced in pieces 15A and 15B. Moreover, The same vibrator may detect turning angular rates around X and Y axes.

Figure 13:
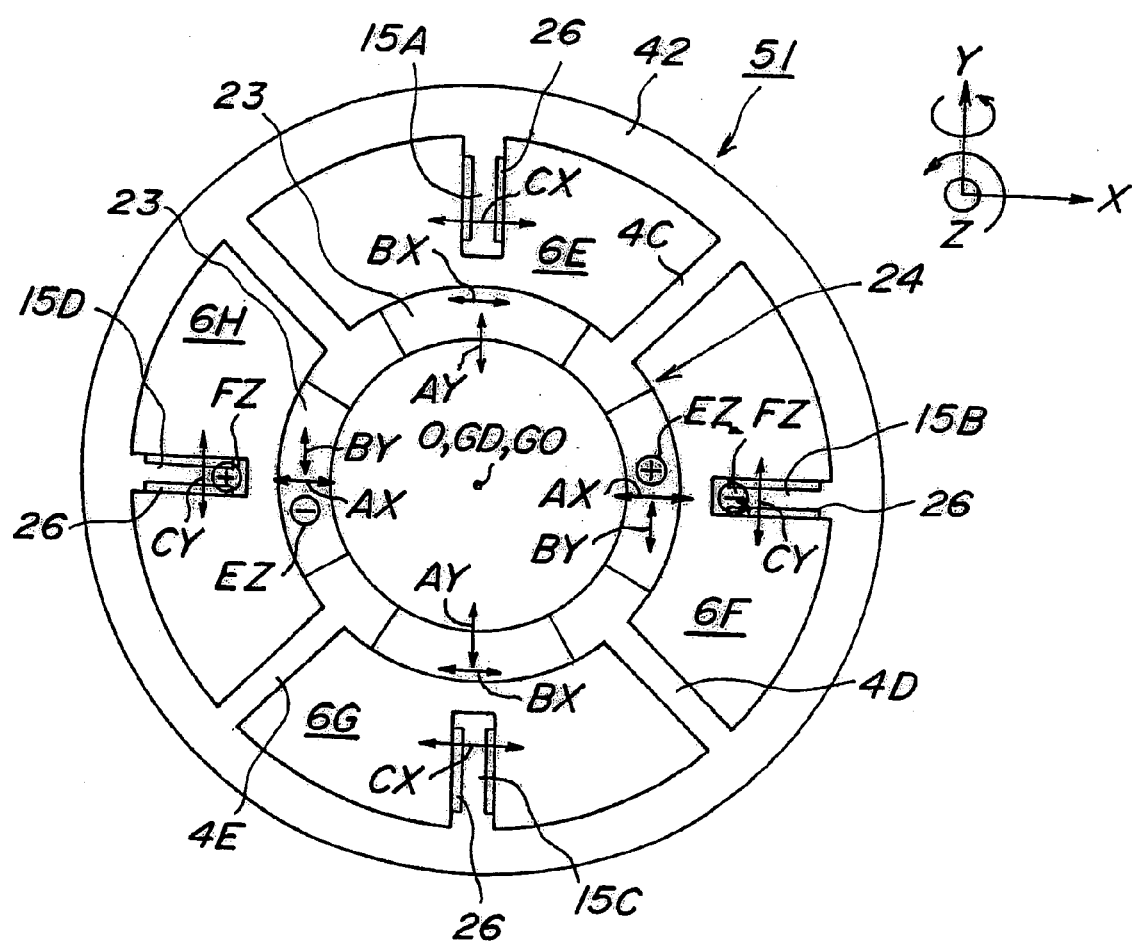
FIG. 13 is a front view showing a vibrator 51 and its vibration modes.

FIG. 13 is a front view of a vibrator 51, in which the forms and mechanism of its loop-shaped vibration system 42, connecting portions 4A to 4D and bending vibration pieces 15A to 15D are same as those of FIGS. 10 to 12.

The vibrator of this embodiment uses second loop-shaped vibration system 24 as its driving vibrator. That is, driving vibration is excited in second vibration system 24 as arrows AX and AY. The driving vibration is vibration with its nodes in crossing or connecting points of the system 24 and connecting portions 15A to 15D. The turning of the vibrator 51 around a turning axis Z induces Coriolis force effected on the vibrator in directions perpendicular to the directions of the driving vibration, to induce vibration components BX and BY in second vibration system 24.

Responsive to the components, bending vibration components CX are induced within the specified plane in the pieces 15A and 15C, and bending vibration components CY are induced within the plane in the pieces 15B and 15D.

The turning of the vibrator 51 around a turning axis Y induces vibration components as arrows EZ in the direction of Z axis in regions in the system 24, in which an amplitude of the X-direction driving vibration component AX is large. Responsive to the Z-direction vibration components, detection vibration components FZ are induced in the direction of Z axis in bending vibration pieces 15C and 15D.

Figure 14:
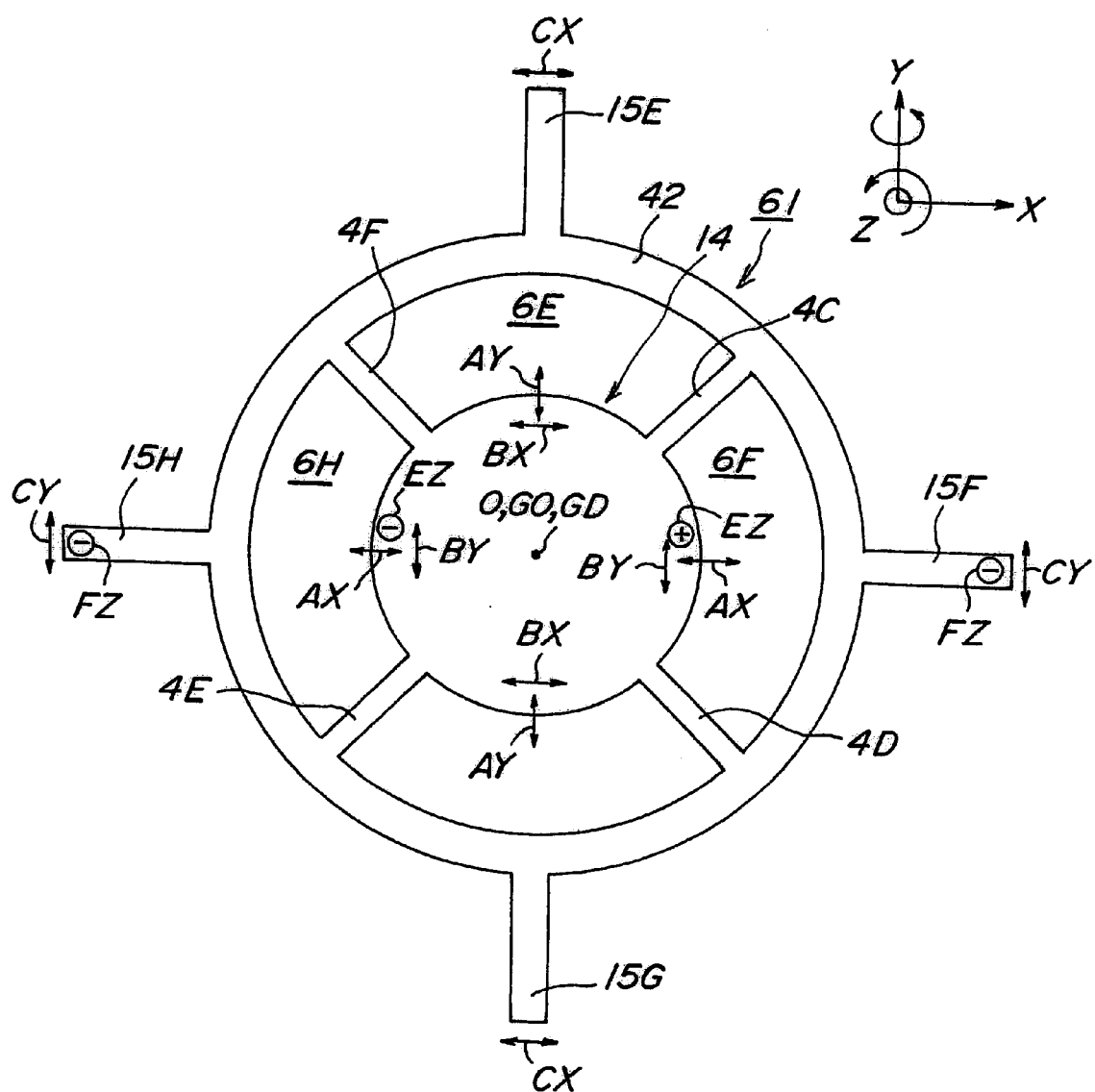
FIG. 14 is a front view showing a vibrator 61 and its vibration modes.

FIG. 14 is a front view of a vibrator 61, in which the forms and mechanisms of its loop-shaped vibration system 42, connecting portions 4A to 4D and plate shaped vibration system 14 are same as those shown in FIGS. 10 to 12.

The vibrator of this embodiment comprises bending vibration pieces 15E, 15F, 15G and 15H extending, from the outer edge of the system 42, radially with respect to the center of gravity of the vibrator. The mechanism of these pieces are same as those of bending vibration pieces 15A to 15D described above.

The vibrator shown in FIGS. 10 to 14 may comprise bending vibration pieces extending from the inner edge and outer edge of the loop-shaped vibration system. Although the positions and numbers of the pieces may be varied, the pieces may preferably be provided two to four, and in positions diad-, triad-, or quad-symmetrical with respect to the center of gravity GO.

In the invention, detection vibration may be detected in the loop-shaped vibration system, or in second vibration system or plate shaped vibration system, without providing the bending vibration piece in the vibrator. FIGS. 15 to 20 relate to such embodiments.

Figure 15:
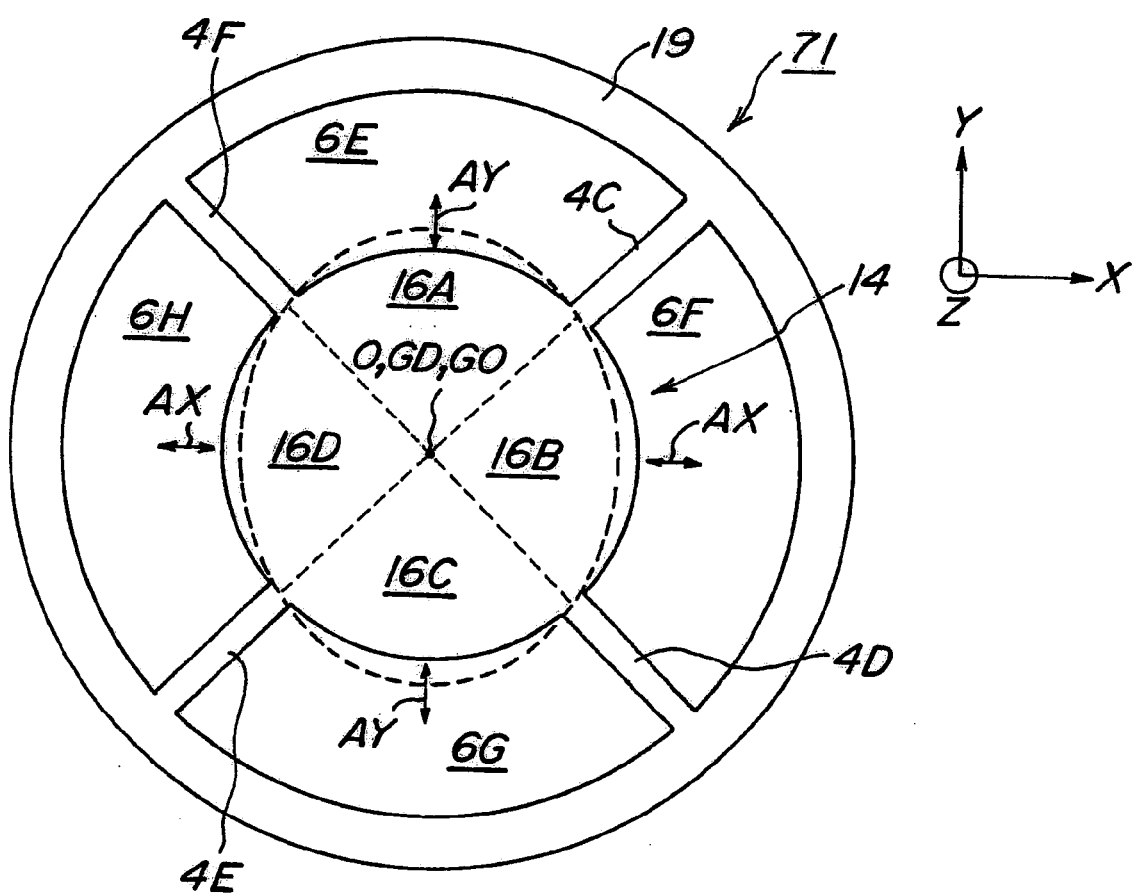
FIG. 15 is a front view showing a vibrator 71 and its vibration modes.

FIG. 15 is a front view of a vibrator 71 with a loop-shaped vibration system having circular shape. A plate and disk shaped vibration system 14 is provided in the system 19. The systems 14 and 19 are connected with, for example, four connecting portions 4C, 4D, 4E and 4F.

Figure 16:
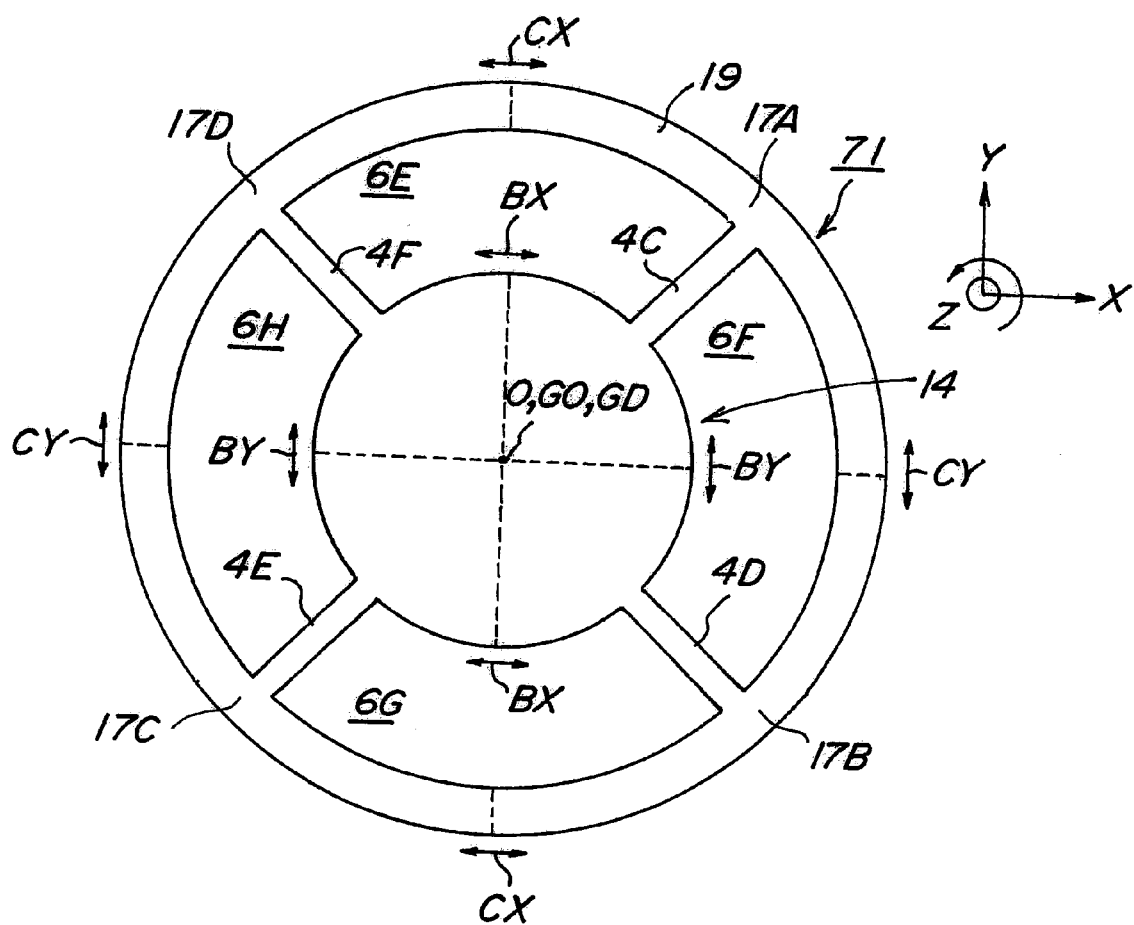
FIG. 16 is a front view showing the detection vibration of the vibrator 71, when it is turned around Z axis.

In the embodiment, driving vibration is excited in the system 14 as arrows AX and AY. The turning of the vibrator 71 around a turning axis Z induces Coriolis force in the directions perpendicular to the directions of the driving vibration. As shown in FIG. 16, such Coriolis force induces vibration components BX and BY in the system 14. Responsive to the vibration components, vibration components CX and CY within the specified plane are induced in the system 19. Such vibration components are both vibration components in which the system 19 vibrates in expanding and contracting motion circumferentially or approximately in its longitudinal direction.

Figure 17:
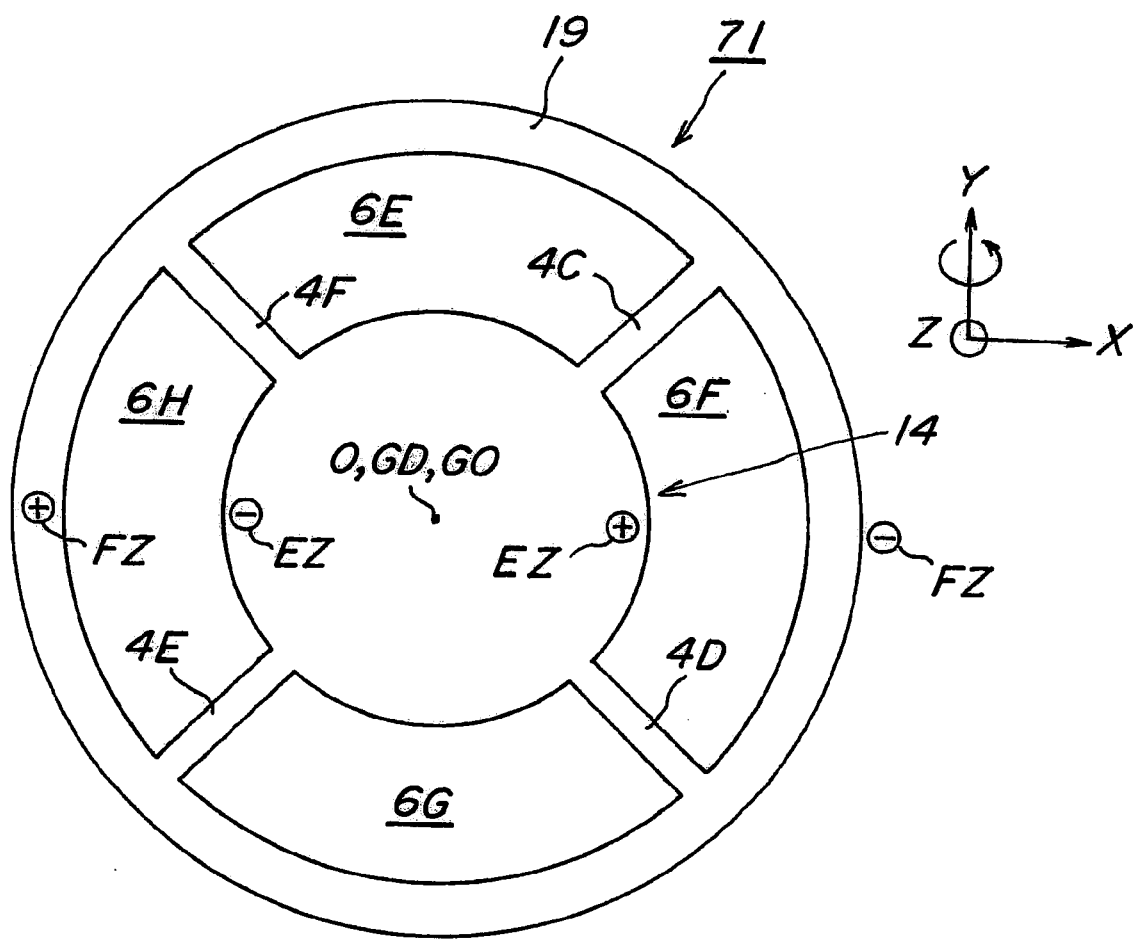
FIG. 17 is a front view showing the detection vibration of the vibrator 71, when it is turned around Y axis.

When the vibrator 71 is turned as shown in FIG. 17 around a turning axis Y, the Y-direction vibration components AY of the driving vibration shown in FIG. 15 are not influenced by the turning, and the X-direction vibration components AX induce Coriolis force in the vibrator. As a result, as shown in FIG. 17, Z-direction vibration components EZ are induced in regions of the system 14, where an amplitude of the driving vibration component AX is large. Responsive to the vibration components, detection vibration components FZ are induced in the direction of Z axis in the system 19. Each vibration component FZ is bending vibration of the vibration system, possibly providing a higher sensitivity than a vibrator using a detection vibration in expansion and contraction movement. Needless to say, the vibrator may detect a turning angular rate around X axis.

Figure 18:
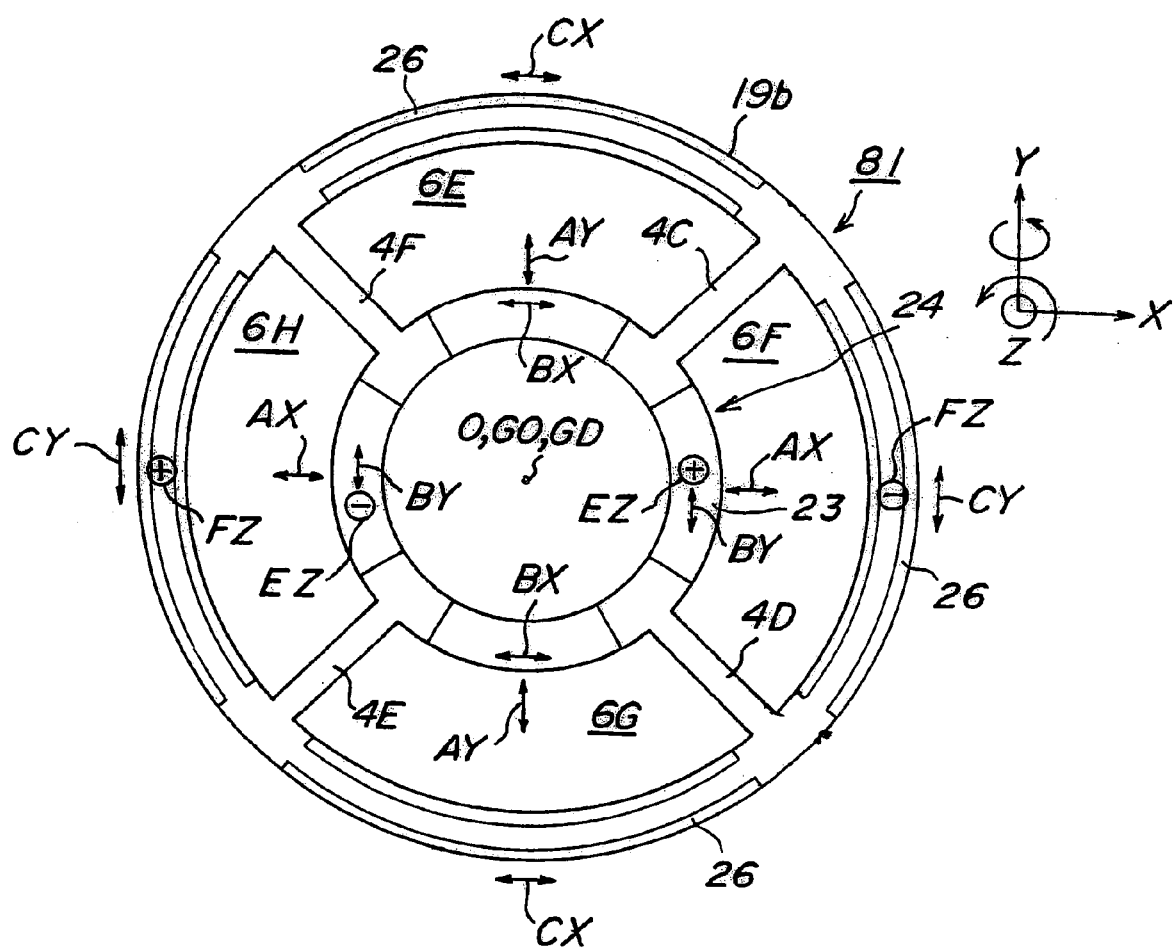
FIG. 18 is a front view showing a vibrator 81 and its vibration modes.

FIG. 18 is a front view of a vibrator 81, in which the forms and mechanism of the loop-shaped vibration system 19 and connecting portions 4A to 4D are same as those shown in FIGS. 15 to 17. However, in the embodiment, second vibration system 24 is used as the driving vibrator. That is, driving vibration is excited in second vibration system 24 as arrows AX and AY. The driving vibration is bending vibration whose nodes are in crossing or connecting points of the system 24 and the connecting portions.

Figure 19:
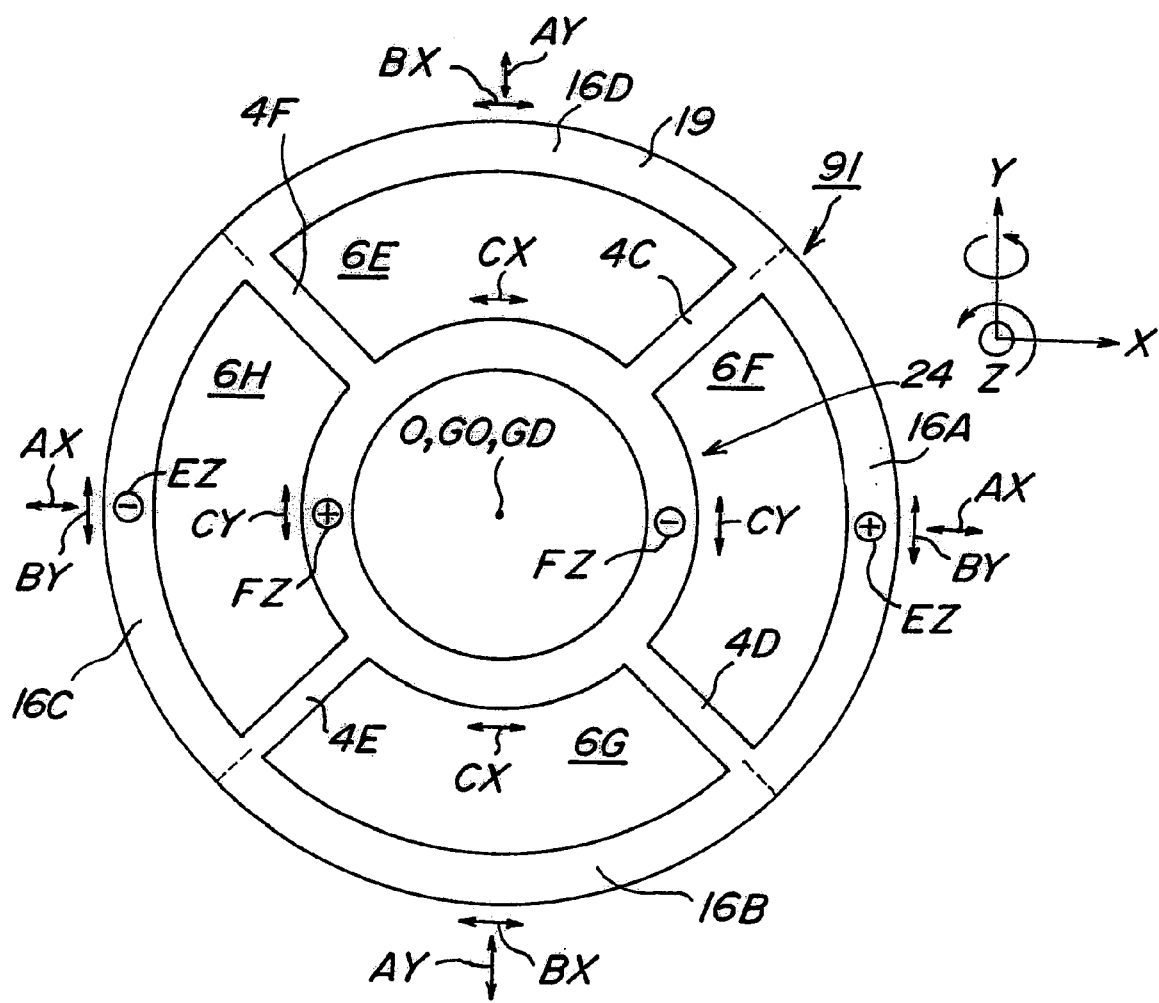
FIG. 19 is a front view showing a vibrator 91 and its vibration modes.

Alternately, driving vibration may be excited in outer loop-shaped vibration system and detection vibration may be induced in an inner vibration system, in particular, a plate shaped vibration system. FIG. 19 relates to this embodiment.

That is, driving vibration is excited in the system 19 as arrows AX and AY. The driving vibration is composed of bending vibration having nodes in the crossing or connecting points of the system 19 and connecting portions 4C to 4F. The turning of the vibrator 91 around a turning axis Z induces Coriolis force effecting on the vibrator in directions perpendicular to the directions of the driving vibration, thus inducing vibration components as arrows BX and BY in the system 19. Responsive to the vibration components, detection vibration components CX and CY are induced in second vibration system 24.

When the vibrator 91 is turned around a turning axis Y, Y-direction vibration components AY of the driving vibration are not influenced by the turning and its X-direction vibration components AX induce Coriolis force. As a result, Z-direction vibration components EZ are induced in regions in the system 19 where an amplitude of the X-direction driving vibration component AX is large. Responsive to EZ, Z-direction vibration components FZ are induced in the system 24.

The inventive vibrator may comprise three or more loop-shaped vibration systems. In this embodiment, although driving vibration may be excited in either of the systems, it is necessary to detect detection vibration in the system or systems with no driving vibration excited. Although any number of loop-shaped vibration systems may be provided with no definite upper limit, four or less of systems may preferably be provided for reducing its manufacturing costs and difficulties.

More preferably, two or more loop-shaped vibration systems are provided for detection, in which the systems detect two or more turning angular rates around different axes. Such vibrator may detect turning angular rates around different axes using the same vibrator with improved signal/noise ratios.

Figure 20:
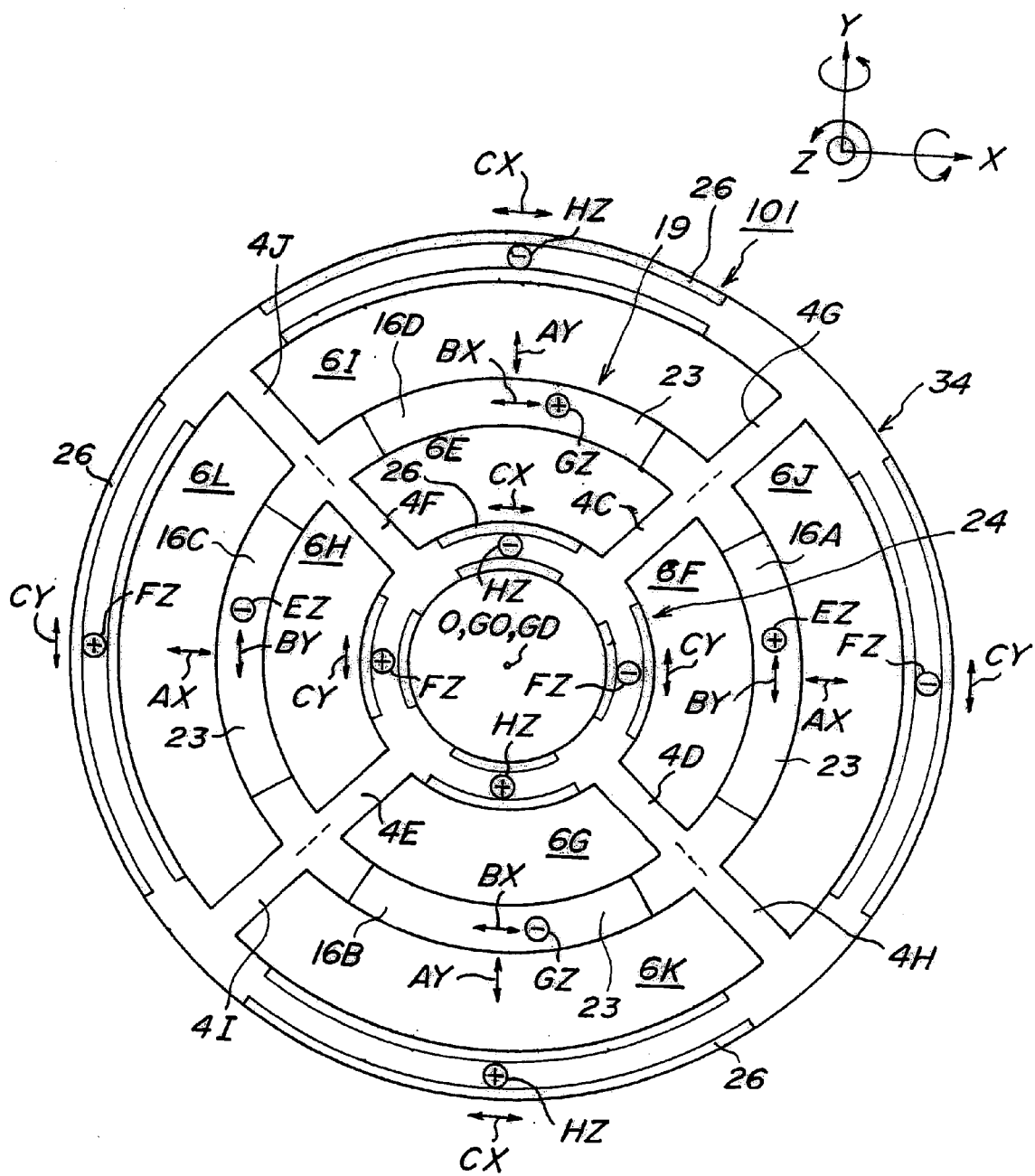
FIG. 20 is a front view showing a vibrator 101 and its vibration modes.

In this embodiment, one loop-shaped vibration system may detect turning angular rates around X axis and Y axis, and the other loop-shaped vibration system may detect a turning angular rate around Z axis. Further, three loop-shaped vibration systems may detect turning angular rates around X axis, Y axis and Z axis, respectively. FIG. 20 relates to a vibrator with such three loop shaped vibration systems.

A vibrator 101 comprises a loop-shaped vibration system 19, second loop-shaped vibration system 24 and an outer loop shaped vibration system 34. The systems 19, 24 and 34 have a shape of, for example, a circle.

The systems 19 and 24 are connected with, for example, four connecting portions 4C, 4D, 4E and 4F. The systems 19 and 34 are connected with, for example, four connecting portions 4G, 4H, 4I and 4J, to form spaces 6I, 6J, 6K and 6L between them.

In the embodiment, driving vibration is excited in the system 19 as arrows AX and AY. When the vibrator 101 is turned around a turning axis Z, Coriolis force is effected on the vibrator in directions perpendicular to the directions of driving vibration, to induce vibration components BX and BY in the system 19. Responsive to the vibration components, bending vibration components CX and CY within the specified plane are induced in the system 24. Bending vibration components CX and CY within the specified plane are induced in the system 34.

When the vibrator 101 is turned around a turning axis Y, Y-direction vibration components AY are not influenced by the turning, and X-direction vibration components AX induce Coriolis force on the vibrator. As a result, Z-direction vibration components EZ are induced in regions in system 19 where an amplitude of the X-direction vibration component AX is large. Responsive to the vibration components, Z-direction vibration components FZ are induced in second and outer vibration components 24 and 34, respectively.

Then, for example, a turning angular rate around Z axis is detected in the inner system 24, and turning angular rates around X axis and/or Y axis are detected in the outer system 34.

Although particular embodiments of the invention has been described above, it is understood that the embodiments may be modified without departing from the scope of the invention, which is limited only by the appended claims.

What is claimed is:

1. A vibrator comprising a loop-shaped vibration system, another vibration system, and a connecting portion connecting said loop-shaped vibration system and said another vibration system, wherein said another vibration system comprises a base portion connected with said loop-shaped vibration system through said connecting portion and at least one bending vibration piece extending from an outer edge portion of said base portion.

2. The vibrator of claim 1, wherein said loop-shaped vibration system and said another vibration system are formed along a plane.

3. The vibrator of claim 2, wherein said another vibration system is formed within said loop-shaped vibration system in said plane.

4. The vibrator of claim 1, wherein said another vibration system comprises a plurality of said bending vibration pieces which are located centrosymmetrically with respect to the center of gravity of said vibrator.

5. The vibrator of claim 4, wherein said bending vibration pieces are located diad-, triad-, or quad-symmetrically with respect to said center of gravity of said vibrator.

6. The vibrator of claim 1, wherein the center of gravity of said loop-shaped vibration system is located on or in the vicinity of the center of gravity of said vibrator.

7. The vibrator of claim 1, wherein said base portion is a flat plate.

8. The vibrator of claim 1, wherein said loop-shaped vibration system has the shape of a circle or an ellipse.

9. The vibrator of claim 5, wherein said loop-shaped vibration system has the shape of a circle or an ellipse.

10. The vibrator of claim 1, wherein said loop-shaped vibration system bending-vibrates.

11. The vibrator of claim 1, wherein said loop-shaped vibration system vibrates in a bending vibration mode whose nodes are on cross regions where said loop-shaped vibration system and said connecting portion join one another.

12. The vibrator of claim 11, wherein said loop-shaped vibration system has the shape of a circle or an ellipse.

13. The vibrator of claim 1, comprising four bending vibration pieces which are located quad-symmetrically with respect to the center of gravity of said vibrator and four bridge connecting portions which are located quad-symmetrically with respect to said center of gravity of said vibrator, said loop-shaped vibration system having the shape of a circle or an ellipse.

14. The vibrator of claim 13, wherein said base portion is square shaped, said bending vibration pieces extend from four sides of said base portion and said connecting portions extend from the four corners of said base portion.

15. The vibrator of claim 14, wherein said loop-shaped vibration system vibrates in a bending vibration mode with four nodes being on four cross regions where said loop-shaped vibration system and said four connecting portions join one another.

16. A vibratory gyroscope for detecting a turning angular rate in a turning system, comprising:

a vibrator comprising a loop-shaped vibration system, another vibration system, and a connecting portion connecting said loop-shaped vibration system and said another vibration system, wherein said another vibration system is formed within said loop-shaped vibration system in a plane, and said another vibration system comprises a base portion connected with said loop-shaped vibration system through said connecting portion, and at least one bending vibration piece extending from an outer edge portion of said base portion;

exciting means for exciting driving vibration in said vibrator and provided in one of said loop-shaped vibration system and said another vibration system; and detecting means for detecting detection vibration in said vibrator when said vibrator is turned about an axis and provided in the other of said loop-shaped vibration system and said another vibration system.

17. The vibratory gyroscope of claim 16, wherein said another vibration system comprises a plurality of said bending vibration pieces located centrosymmetrically with respect to the center of gravity of said vibrator.

18. The vibratory gyroscope of claim 14, wherein said bending vibration pieces are located diad-, triad-, or quad-symmetrically with respect to said center of gravity of said vibrator.

19. The vibratory gyroscope of claim 16, wherein the center of gravity of said loop-shaped vibration system is located on or in the vicinity of the center of gravity of said vibrator.

20. The vibratory gyroscope of claim 16, wherein said loop-shaped vibration system has the shape of a circle or an ellipse.

21. The vibratory gyroscope of claim 16, wherein the center of gravity of said loop-shaped vibration system is located on or in the vicinity of the center of gravity of said vibrator.

22. The vibratory gyroscope of claim 16, wherein said loop-shaped vibration system has the shape of a circle or an ellipse.

23. The vibratory gyroscope of claim 16, wherein said loop-shaped vibration system and said another vibration system are formed along a plane, said vibratory gyroscope is to detect a turning angular rate around an axis, Z, perpendicular to said plane and, when said detection vibration comprising an in-plane vibration component, CY, parallel with said plane is induced by Coriolis force effected on said vibrator depending on said turning around said axis Z, said vibratory gyroscope detects said in-plane vibration component CY.

24. The vibratory gyroscope of claim 16, wherein said loop-shaped vibration system and said another vibration system are formed along a plane, said vibratory gyroscope is to detect a turning angular rate around one of two axes, X and Y, parallel with said plane and, when said detection vibration comprising a normal-plane vibration component, FZ, perpendicular to said plane is induced by Coriolis force effected on said vibrator depending on said turning around one of said two axes, said vibratory gyroscope detects said normal-plane vibration component FZ.

25. The vibratory gyroscope of claim 16, wherein said loop-shaped vibration system and said another vibration system are formed along a plane, said vibratory gyroscope is to detect turning angular rates around an axis, Z, perpendicular to said plane and at least one of two axes, X and Y, parallel with said plane and, when said detection vibration comprising an in-plane vibration component, CY, parallel with said plane and a normal-plane vibration component, FZ, perpendicular to said plane is induced by Coriolis force effected on said vibrator depending on said turning angular rates around said axes, Z, and X or Y, said vibratory gyroscope detects said in-plane vibration component and said normal-plane vibration component.

26. The vibratory gyroscope of claim 25, wherein said vibratory gyroscope is to detect turning angular rates around both of said two axes, X and Y, parallel with said plane and, when said detection vibration comprising normal-plane vibration components perpendicular to said plane is induced by Coriolis force effected on said vibrator depending on said turning angular rates around said two axes parallel with said plane, said vibratory gyroscope detects said normal-plane vibration components.

27. The vibratory gyroscope of claim 16, wherein, when exciting said driving vibration in one of said loop-shaped vibration system and said bending vibration piece, the other does not substantially vibrate unless said vibrator is turned.

28. The vibratory gyroscope of claim 16, wherein said vibratory gyroscope is to detect a turning angular rate around an axis, Z, perpendicular to said plane and, when said detection vibration comprising an in-plane vibration component, CY, parallel with said plane is induced by Coriolis force effected on said vibrator depending on said turning around said axis Z, said vibratory gyroscope detects said in-plane vibration component CY.

29. The vibratory gyroscope of claim 16, wherein said vibratory gyroscope is to detect a turning angular rate around at least one of two axes, X and Y, parallel with said plane and, when said detection vibration comprising a normal-plane vibration component, FZ, perpendicular to said plane is induced by Coriolis force effected on said vibrator depending on said turning around said axis, said vibratory gyroscope detects said normal-plane vibration component FZ.

30. The vibratory gyroscope of claim 16, wherein said vibratory gyroscope is to detect turning angular rates around an axis, Z, perpendicular to said plane and at least one of two axes, X and Y, parallel with said plane and, when said detection vibration comprising an in-plane vibration component, CY, parallel with said plane and a normal-plane vibration component, FZ, perpendicular to said plane is induced by Coriolis force effected on said vibrator depending on said turning angular rates around said axes, Z, and X or Y, said vibratory gyroscope detects said in-plane vibration component and said normal-plane vibration component.

31. The vibratory gyroscope of claim 28, wherein said driving vibration is excited in said loop-shaped vibration system and said detecting means is provided on said bending vibration piece for detecting said in-plane vibration component induced in said bending vibration piece.

32. The vibratory gyroscope of claim 31, wherein said loop-shaped vibration system vibrates in a bending vibration mode whose nodes are on cross regions where said loop-shaped vibration system and said connecting portion join one another.

33. The vibratory gyroscope of claim 16, comprising four bending vibration pieces which are located quad-symmetrically with respect to the center of gravity of said vibrator and four bridge connecting portions which are located quad-symmetrically with respect to the center of gravity of said vibrator, said loop-shaped vibration system having the shape of a circle or an ellipse.

34. The vibratory gyroscope of claim 33, wherein said vibratory gyroscope is to detect a turning angular rate around an axis, Z, perpendicular to said plane and, when said detection vibration comprising an in-plane vibration component, CY, parallel with said plane is induced by Coriolis force effected on said vibrator depending on said turning around said axis Z, said vibratory gyroscope detects said in-plane vibration component CY.

35. The vibratory gyroscope of claim 34, wherein said driving vibration is excited in said loop-shaped vibration system and said detecting means is provided on each of said bending vibration pieces for detecting said in-plane vibration component induced in each of said bending vibration pieces.

36. The vibrator of claim 35, wherein said base portion is square shaped, said bending vibration pieces extend from the four sides of said base portion and said connecting portions extend from the four corners of said base portion.

37. The vibrator of claim 36, wherein said loop-shaped vibration system vibrates in a bending vibration mode with four nodes being on four cross regions where said loop-shaped vibration system and said four connecting portions join one another.

* * * * *